United States Patent
Hiller

(10) Patent No.: US 11,853,083 B2
(45) Date of Patent: Dec. 26, 2023

(54) DRONE COORDINATED SATELLITE COMMUNICATIONS, ENERGY HARVESTING, AND CAMOUFLAGE

(71) Applicant: The Boeing Company, Chicago, IL (US)

(72) Inventor: Nathan D. Hiller, Irvine, CA (US)

(73) Assignee: THE BOEING COMPANY, Chicago, IL (US)

( * ) Notice: Subject to any disclaimer, the term of this patent is extended or adjusted under 35 U.S.C. 154(b) by 140 days.

(21) Appl. No.: 17/517,513

(22) Filed: Nov. 2, 2021

(65) Prior Publication Data

US 2022/0147063 A1    May 12, 2022

Related U.S. Application Data

(60) Provisional application No. 63/111,881, filed on Nov. 10, 2020.

(51) Int. Cl.
| | |
|---|---|
| *G05D 1/10* | (2006.01) |
| *B64C 39/02* | (2023.01) |
| *H04B 7/185* | (2006.01) |
| *B64U 20/10* | (2023.01) |
| *B64U 50/34* | (2023.01) |
| *B64U 10/13* | (2023.01) |
| *B64U 101/20* | (2023.01) |
| *B64U 101/00* | (2023.01) |
| *B64U 101/15* | (2023.01) |

(52) U.S. Cl.
CPC .......... *G05D 1/104* (2013.01); *B64C 39/024* (2013.01); *B64U 20/10* (2023.01); *B64U 50/34* (2023.01); *H04B 7/185* (2013.01); *B64U 10/13* (2023.01); *B64U 2101/00* (2023.01); *B64U 2101/15* (2023.01); *B64U 2101/20* (2023.01); *B64U 2201/102* (2023.01)

(58) Field of Classification Search
CPC .... G05D 1/104; H04B 7/185; B64U 2101/20; B64U 20/10; B64U 2201/102
See application file for complete search history.

(56) References Cited

U.S. PATENT DOCUMENTS

| | | | |
|---|---|---|---|
| 7,764,243 B2 | 7/2010 | Gierow et al. | |
| 8,021,122 B2 | 9/2011 | Clayton et al. | |
| 8,319,696 B2 | 11/2012 | Clayton et al. | |
| 10,502,821 B2 * | 12/2019 | Dawber | G01S 13/003 |

OTHER PUBLICATIONS

"Southwest China Puts on Dazzling Drone Show", May 26, 2019, https://www.youtube.com/watch?v=VvemT96Rozc.

* cited by examiner

*Primary Examiner* — Richard G Davis
(74) *Attorney, Agent, or Firm* — Gates & Cooper LLP

(57) ABSTRACT

Methods, Systems, and Apparatus for coordinating drones to communicate with reduced signal to noise, harvest energy, or provide camouflage.

20 Claims, 18 Drawing Sheets

11,853,083 B2

DRONE COORDINATED SATELLITE COMMUNICATIONS, ENERGY HARVESTING, AND CAMOUFLAGE

CROSS REFERENCE TO RELATED APPLICATIONS

This application claims the benefit under 35 U.S.C. Section 119(e) of and commonly-assigned U.S. Provisional Patent Application No. 63/111,881, filed Nov. 10, 2020, by Nathan D. Hiller, entitled "DRONE COORDINATED SATELLITE COMMUNICATIONS, ENERGY HARVESTING, AND CAMOUFLAGE,", which application is incorporated by reference herein.

BACKGROUND

1. Field

The present disclosure relates to methods and systems for coordinating drones.

2. Description of the Related Art

The bulkiness and weight of terrestrial satellite dishes makes them inherently immobile. The existing solutions are to (1) transport a satellite dish using a reasonably large vehicle, or (2) use a gas inflatable satellite dish. The problem with the first solution is a large vehicle for dish transport is not always available. The problem with the second solution is inflating an inflatable dish is time-consuming, and pointing the dish is an awkward and time-consuming manual process. What is needed are more practical methods and systems for deployment of satellite dishes. The present disclosure satisfies this need.

SUMMARY

Drones, systems including the same, and associated methods are disclosed herein.

Illustrative, non-exclusive examples of inventive subject matter according to the present disclosure are described in the following enumerated paragraphs:

A1. A system for increasing a signal to noise ratio of a communication comprising a signal, comprising:
a set of drones;
a plurality of elements, each of the elements mounted to a different one of the drones; and
a computer coupled to the drones, the computer coordinating the set of drones to:
receive, on the elements, electromagnetic radiation carrying the signal transmitted from a transmitter, and
transmit, from the elements, the electromagnetic radiation to a receiver, and
so that the receiver receives the signal having an increased signal to noise ratio.

B1. A system for energy harvesting, comprising:
a set of transmitter drones;
a plurality of elements, each of the elements mounted to a different one of the transmitter drones;
a computer coupled to the drones, the computer coordinating the set of transmitter drones to:
receive solar energy on the elements,
transmit, from the elements, at least a portion of the solar energy to a device on a receiver drone, the device including at least one of a photovoltaic device or a first thermoelectric module, and so that the device converts the at least a portion of the solar energy to electrical power with increased efficiency.

C1. A system for camouflaging, comprising:
a set of drones comprising one or more sources of radiation; and
a computer coupled to the drones, the computer coordinating:
positioning of the set of drones, and
a transmission of the radiation from each of the drones in at least one of a direction:
above the drones, so that the radiation camouflages a region below the drones from a detection from above the drones, or
below the drones, so that the radiation camouflages the region above the drones from a detection from below the drones.

BRIEF DESCRIPTION OF THE DRAWINGS

FIGS. 11A-11D illustrate mounting of an LED display and an infrared block on a drone, wherein FIG. 11A is top view, FIG. 11B is a side view, FIG. 11C is a side view showing using the LED display for camouflage and FIG. 11D is a side view showing using the infrared block for camouflage.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

The present disclosure describes methods and systems wherein a swarm of drones (e.g., worker drones) are called and coordinated to provide assistance in various communications, energy harvesting, and camouflage applications. In one embodiment, the drones are coordinated or synchronized to form a shape (e.g., a parabolic shape) providing mobile and dynamic control of communications signal gain at a receiver drone (e.g., queen drone) for ground personnel or a mobile ground unit. In another example, the drones are coordinated or synchronized to form a shape concentrating sunlight for energy harvesting. In yet another example, the drones are coordinated or synchronized to emit electromagnetic radiation creating a dynamic camouflage (e.g., for moving vehicles or ground personnel). These embodiments are discussed in further detail in the following sections.

Figure 1A:
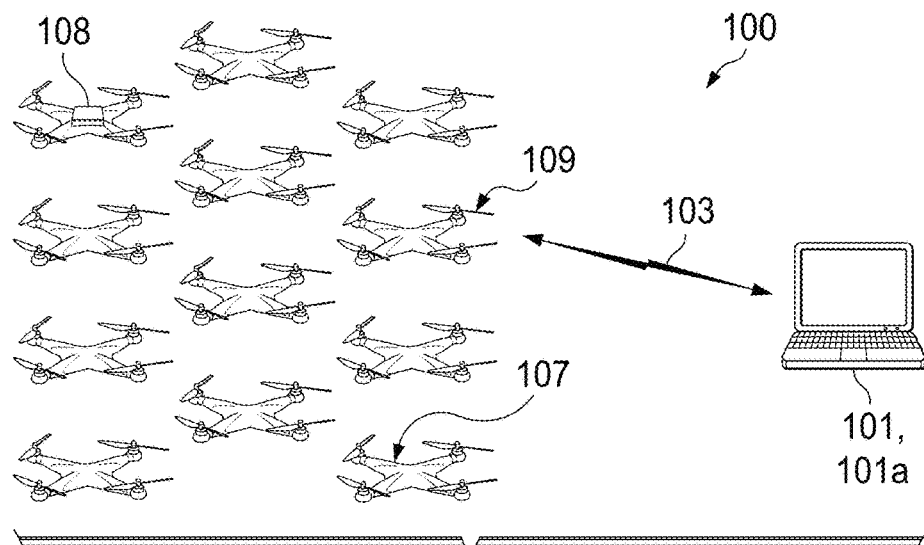
FIG. 1A illustrates calling a swarm of drones for assistance in a mobile communications application, an energy harvesting application, or camouflage application.

FIG. 1A illustrates an example set 104 of unmanned aerial vehicles (e.g., drones 106) that are used in embodiments described herein. The drones each comprise a chassis or body 107 supporting a propulsion system (e.g., propellers 109), and a power source to power the propulsion system or other components of the drone. In one or more examples, the drones further comprise sensors to sense, e.g., operation, movement and/or orientation (e.g., roll, pitch, location, speed) of the drone. In one or more examples, each of the drones includes a processor or on board computer and transceiver that manages communications 103 with a control system 101a (e.g., computer 101). In one or more examples, the drones comprise quadcopters.

1. Drone Coordinated Satellite Communications

Figure 1B:
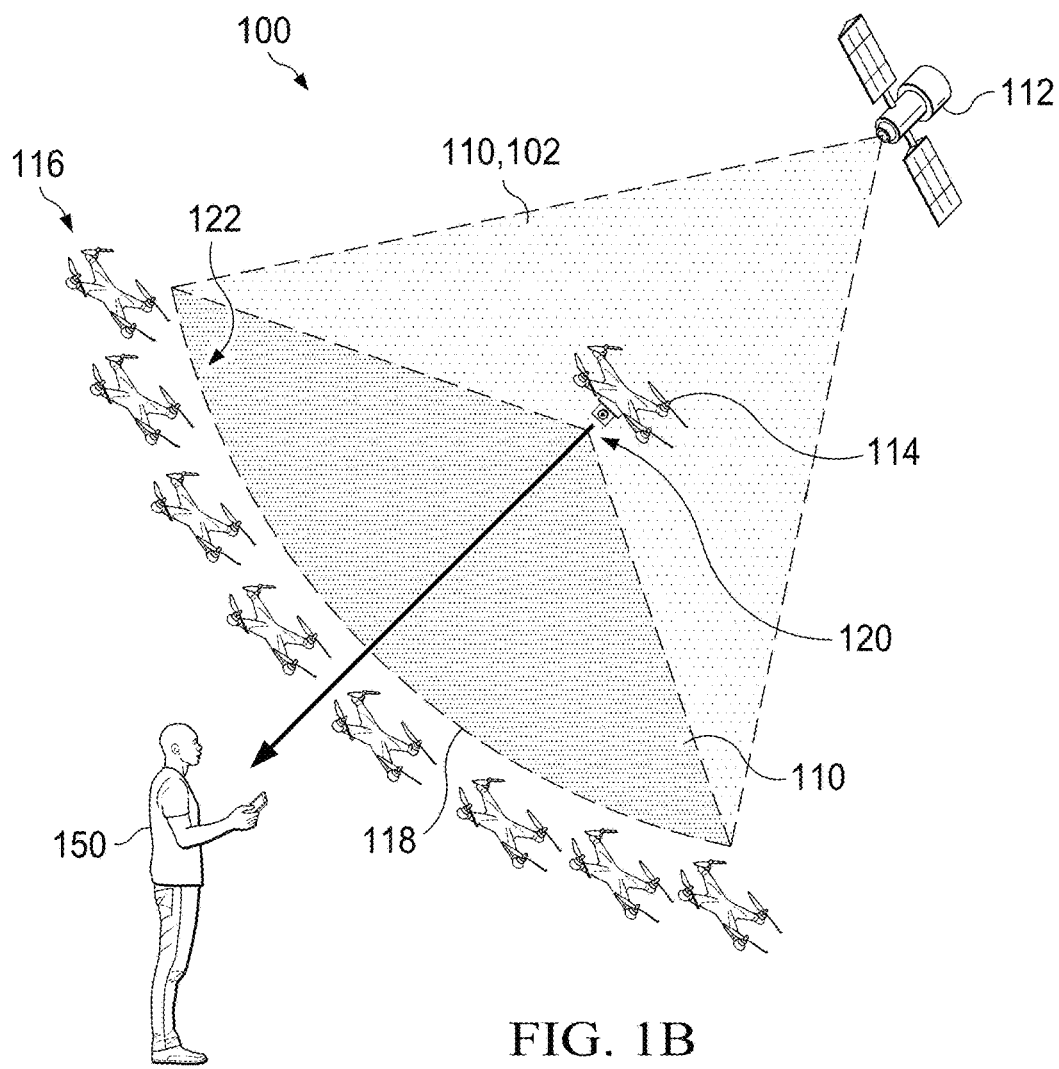
FIG. 1B illustrates an example wherein transmitter drones (e.g., worker drones) form a shape (e.g., a parabolic shape) to provide mobile and dynamic control of communications signal gain at a receiver drone (e.g., queen drone) for ground personnel or a mobile ground unit.

FIG. 1B illustrates s system 100 for increasing a signal to noise ratio of a communication comprising a signal 102. The system comprises a set 104 of drones 106 and a plurality of elements 108 each mounted to a different one of the drones. A computer 101 coupled to the drones coordinates 103 the set of drones to (1) receive, on the elements, electromagnetic radiation 110 carrying the signal transmitted from a transmitter 112, and (2) transmit, from the elements, the electromagnetic radiation 110 to a receiver 114, so that the receiver receives the signal having an increased signal to noise ratio. In various examples, the computer coordinates the drones to form an array of the drones at positions 116 having coordinates lying on convex surface 118 in a coordinate system, so that the electromagnetic radiation transmitted from the drones is focused on, concentrated on, converged on, or directed to, at a focal point 120 on the receiver. Examples of a convex surface include, but are not limited to, a paraboloid, a spheroid, or an ellipsoid. In some examples, the signal received on the receiver drone is transmitted to a person 150 via a cellular phone link.

Example elements 108 include, but are not limited to, a reflector, a scattering element, a diffractive element, or a non-diffractive transmissive element.

a. Reflector Example

Figure 2A:
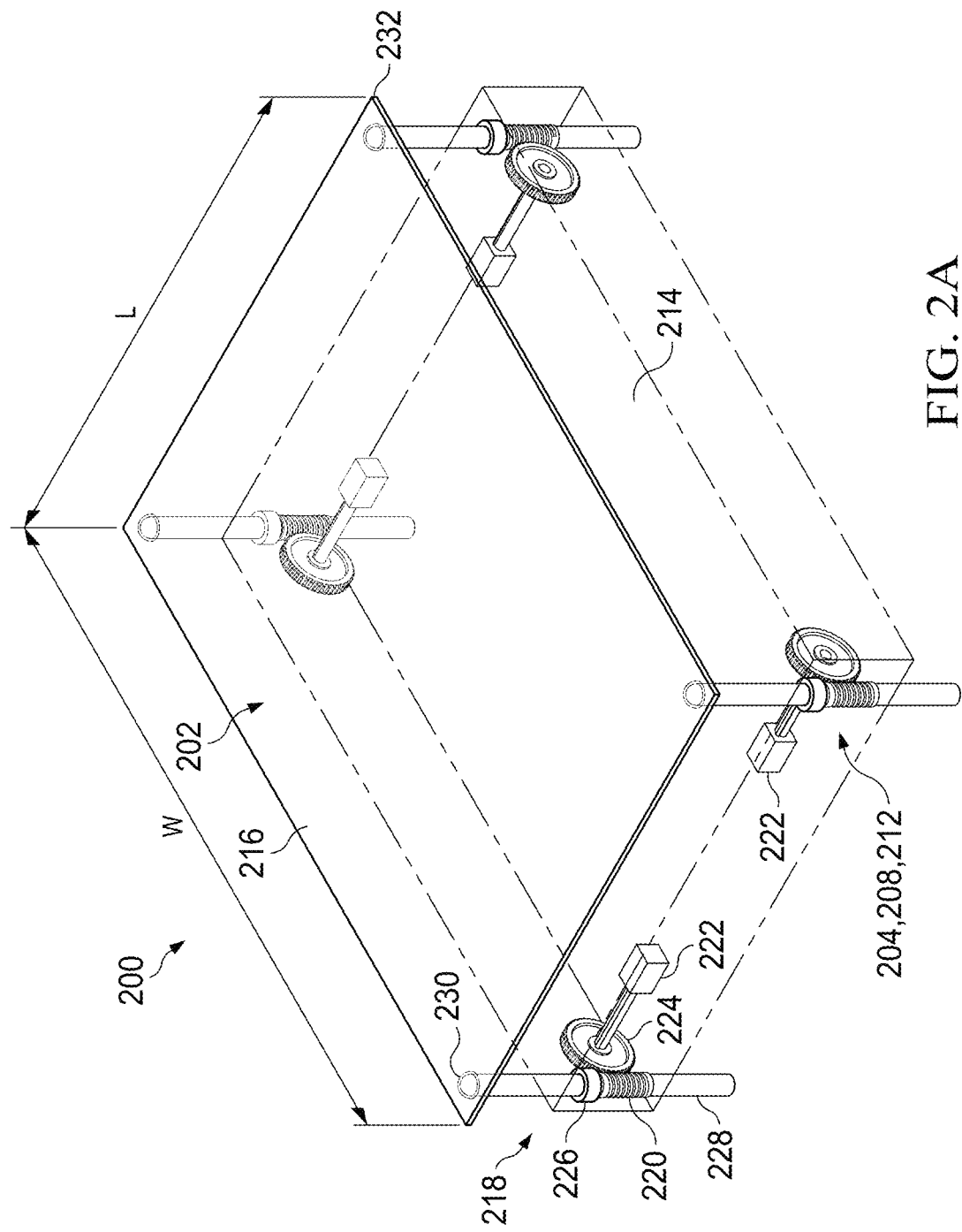
FIG. 2A illustrates an adjustable mechanical reflector mounted to each of the drones for reflecting the electromagnetic radiation in one or more communications or energy harvesting examples.
Figure 2B:
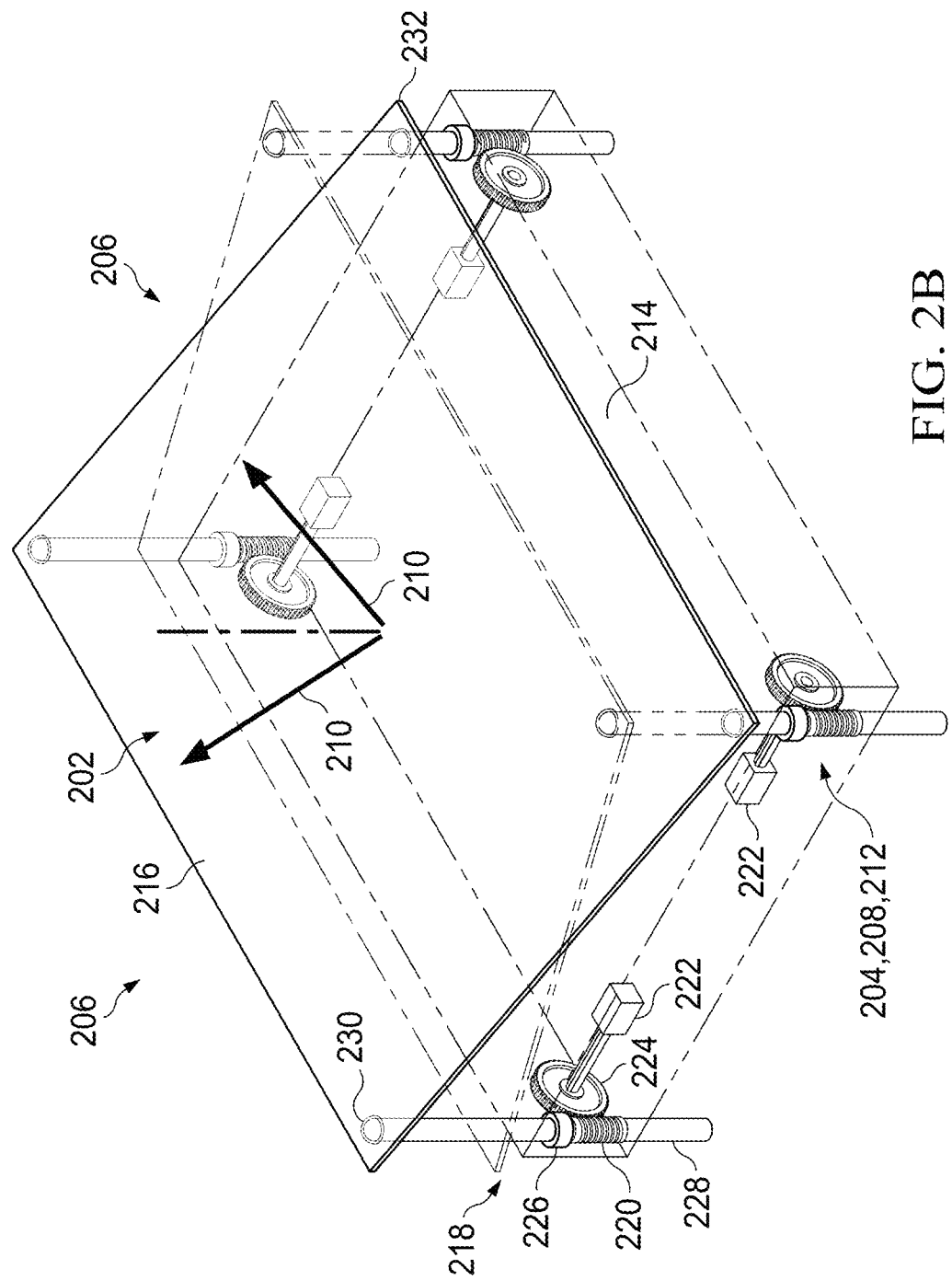
FIG. 2B illustrates how the adjustable mechanical reflector is adjusted (rotated) in a purely x-axis direction to control the direction of the reflected electromagnetic radiation.
Figure 2C:
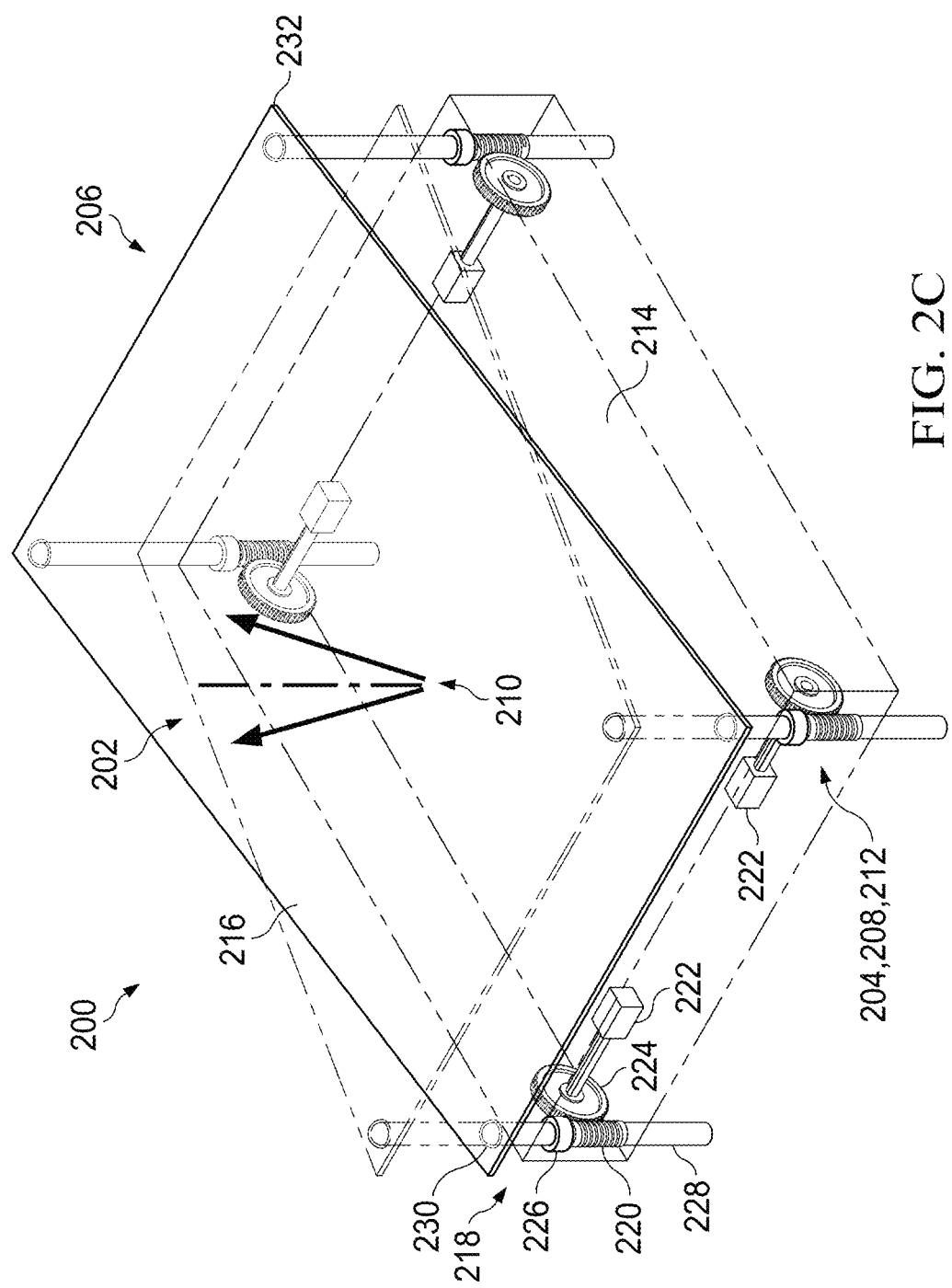
FIG. 2C illustrates how the adjustable mechanical reflector is adjusted (rotated) in a purely y-axis direction to control the direction of the reflected electromagnetic radiation.

FIGS. 2A-2C illustrates an example wherein the elements 108 each comprise an (e.g., flat) reflector 200 having a reflective surface 202. The reflective surface has a length L and a width W at least three times larger than a wavelength of the electromagnetic radiation so as to reduce scattering of the electromagnetic radiation by the (e.g., flat) reflector 200. Each of the reflective surfaces are mounted on a mount 204 to a different one of the drones. The computer controls an orientation 206 of each of the reflective surfaces 202 relative to the each of the drones via an actuator 208 and the mount 204, so that each of the reflective surfaces reflect a portion 210 of the electromagnetic radiation to the receiver.

FIG. 2A illustrates an example wherein each of the mounts comprise a platform 214 and each of the reflective surfaces comprise a surface of a coating or film 216 on the platform. In one example, the platform comprises balsa wood (e.g., ⅛" or 3.18 millimeters thick) covered in reflective 3M's DF2000MA film.

The mount comprises a mechanism 212 adjusting the orientation in two orthogonal directions x and y of a cartesian coordinate system. In one or more examples, the mechanism includes gears or gearing connected to the reflector or reflective surface. FIG. 2A illustrates an example wherein the mechanism 212 comprises a worm drive 218 comprising a plurality of worms 220 driven by an electric motor 222 via worm gears 224. Each of the worms comprise a threaded cap 226 supporting a threaded rod 228. Each of the worms are attached via a joint 230 to the platform to raise or lower a corner 232 or side of the platform to control the orientation of the reflective surface, as illustrated in FIG. 2B and FIG. 2C. In various examples, the joint comprises a ball in spherical socket for locked rotation.

In various examples, the drone's body includes power storage and a central processor controlling the mount to execute commands from the computer coordinating the set of drones. In this way, the computer coordinates the drones to form an array of the drones at positions wherein the reflective surfaces form or approximate the convex surface 118 (e.g., a spheroid, paraboloid, or ellipsoid) focusing, concentrating, directing, or converging the electromagnetic radiation on the receiver. In one or more examples, the computer adjusts an orientation of one or more of the reflective surfaces (and the position of the drone) to correct for a distortion of a wavefront 122 of the electromagnetic radiation incident on the reflective surfaces.

In one or more examples wherein the electromagnetic radiation comprises a radio (RF) signal beam that is typically very large, drone spacing is not critical. For example, if the beam diameter is 1 mile in diameter, the spacing of the drones will not have a significant impact. In other examples when the electromagnetic radiation comprises a narrow optical beam coming from a source much closer than a satellite (i.e. an aircraft), the drones can be spaced as close as possible to capture as much of the beam as possible.

b. Scattering Element Example

Figure 3A:
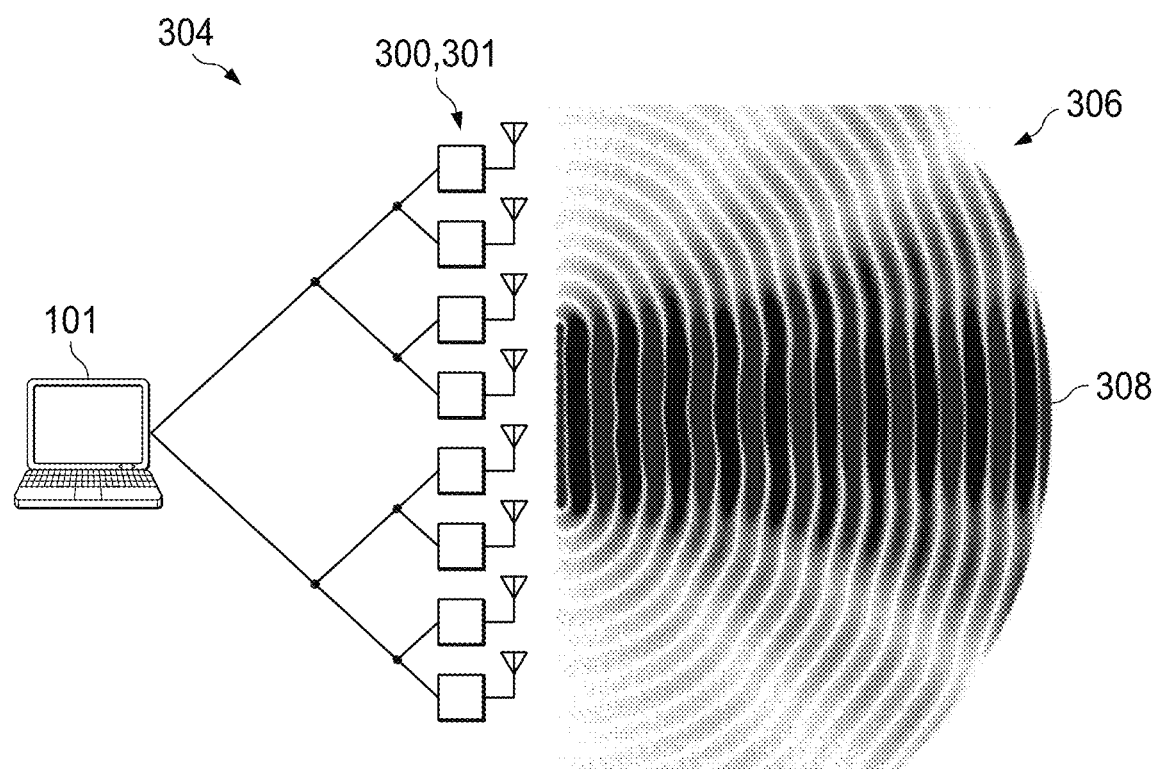
FIG. 3A illustrates an example wherein scattering elements are appropriately positioned on each drone so as to form a phased array such that scattered waves constructively add at the receiver receiving the communications signal.

FIG. 3A illustrates an example wherein the elements 108 each comprise a scattering element 300 (e.g., an antenna 301) and the computer 302 coordinates the drones so that the elements form a phased array 304 scattering the electromagnetic radiation to form scattered waves 306 that constructively interfere 308 or add at the receiver.

Figure 3B:
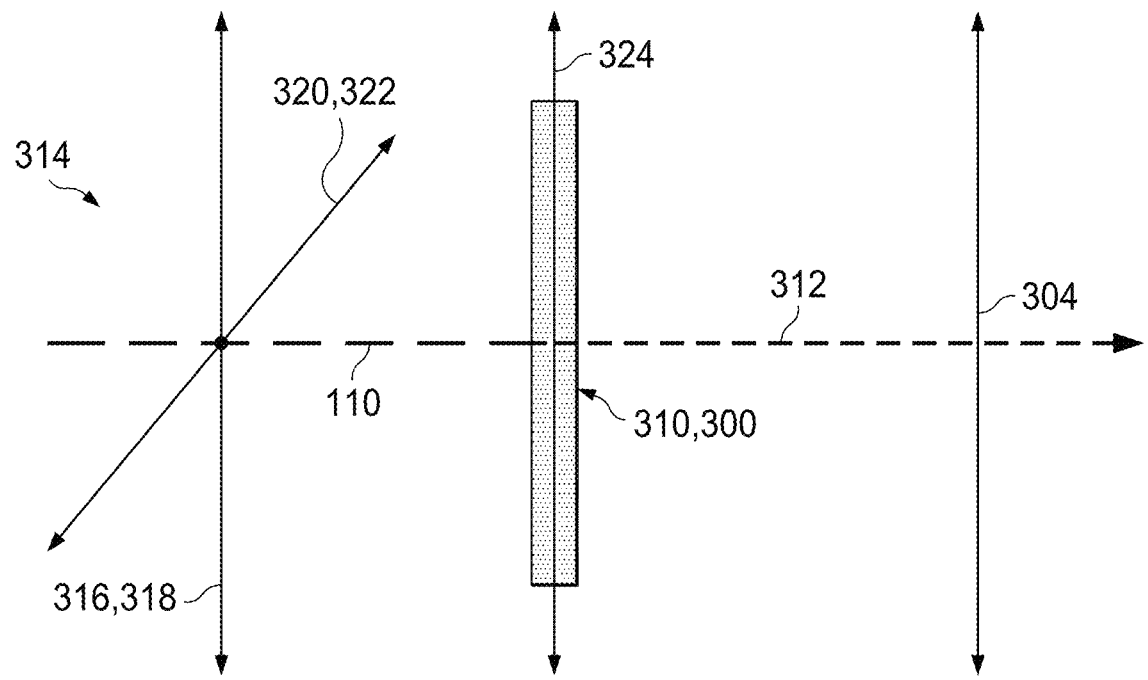
FIG. 3B illustrates how a shape of a scattering element filters the electromagnetic radiation.

FIG. 3B illustrates an example wherein the scattering element 300 has a shape 310 filtering the electromagnetic radiation to form filtered electromagnetic radiation 312 that is then transmitted by the scattering element to the receiver. As illustrated in FIG. 3B, the electromagnetic radiation comprises a polarization 314 having a first component 316 having a first direction 318 and a second component 320 having a second direction 322. The scattering element 300 (e.g., comprising a wire or dipole antenna) has an axis 324 parallel to the first direction 318 so as to scatter the first component to the receiver. The axis 324 is perpendicular to the second direction and therefore does not scatter the second component to the receiver.

c. Diffractive Element Example

Figure 4A:
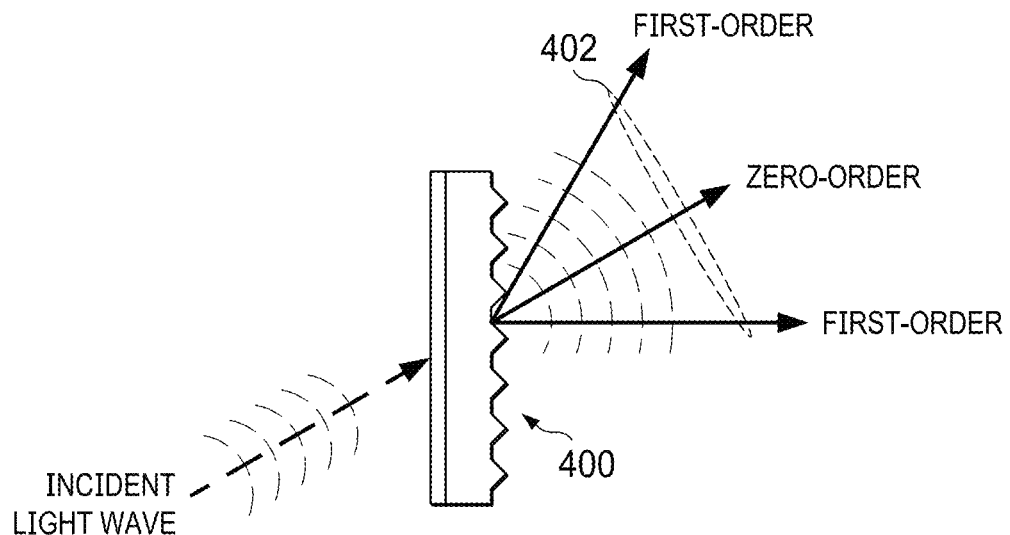
FIG. 4A illustrates a transmissive diffractive element mounted to each of the drones to transmit and diffract the electromagnetic radiation (comprising a signal) to a receiver.
Figure 4B:
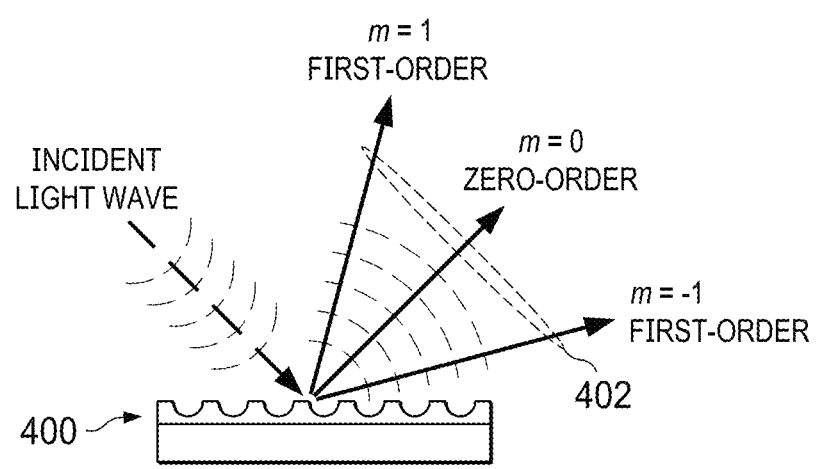
FIG. 4B illustrates a reflective diffractive element mounted to each of the drones to reflect and diffract the electromagnetic radiation (comprising a signal) to a receiver.

FIG. 4A and FIG. 4B illustrates an example wherein the elements each comprise a diffraction grating 400 diffracting the electromagnetic radiation 110 to form one or more diffracted beams 402 transmitted to the receiver.

d. Transmissive Element

Figure 5:
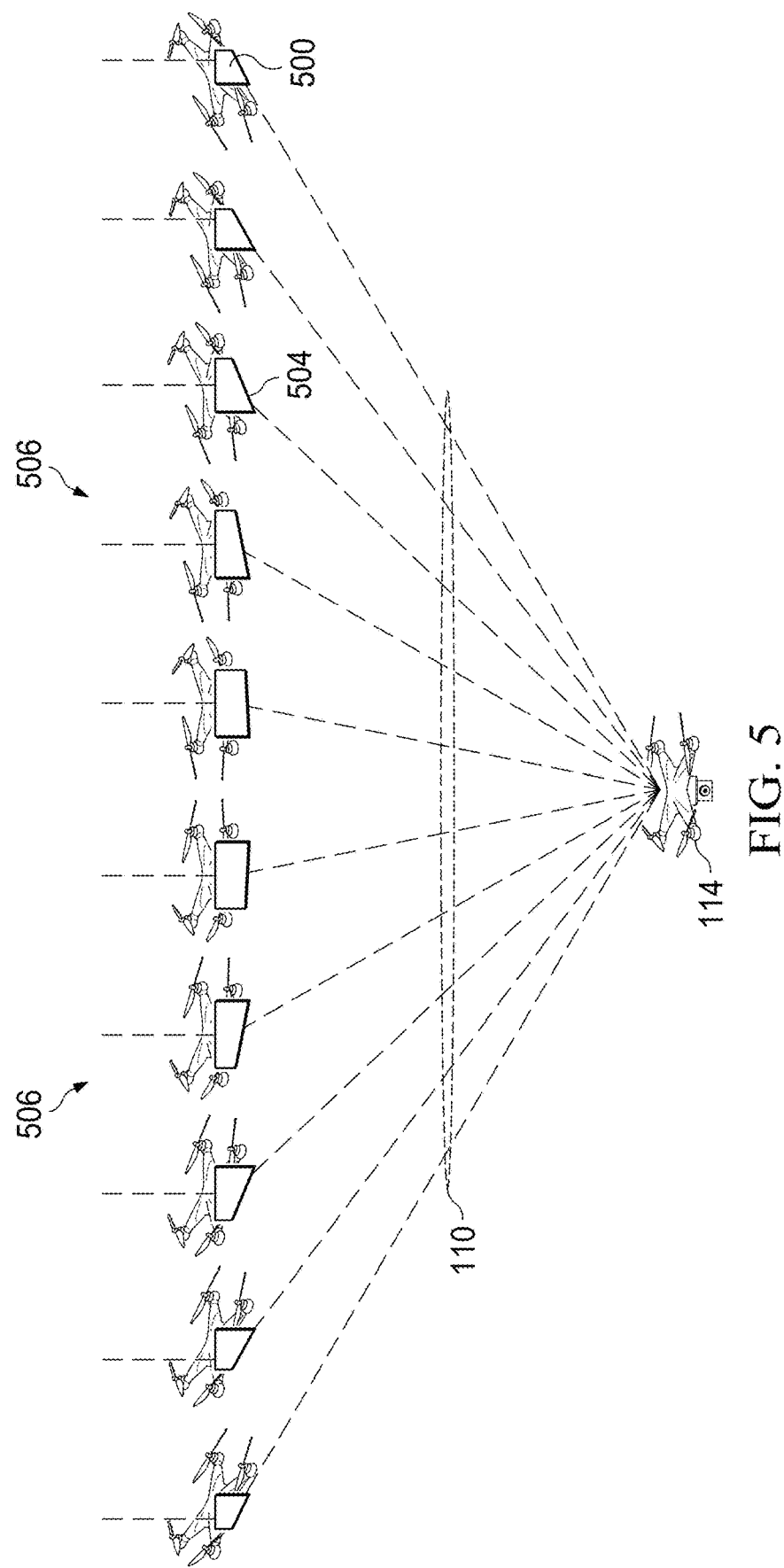
FIG. 5 illustrates a non-diffractive transmissive element comprising glass wedge mounted to each of the drones, wherein each drone has a glass wedge at a different angle such that when the drones assemble, the glass wedges resemble a Fresnel lens focusing the electromagnetic radiation comprising a signal on the receiver.

FIG. 5 illustrates an example wherein the elements each comprise a transmissive element 500 (e.g., wedge) having a different shape 502 or angle 504. The computer coordinates the drones so that the transmissive elements are assembled to form a lens 506 (e.g. Fresnel lens) refracting (e.g., focusing) the electromagnetic radiation 110 onto the receiver.

e. Collective Modulating Retroreflector

FIG. 6A-7B illustrate a system 600 for communicating comprising a set 104 of drones 106; and a plurality of modulators 602 each mounted to a different one of the drones. A computer coupled to the drones coordinates the set of drones to (1) receive, on the modulator, a beam of electromagnetic radiation transmitted from a transmitter, modulate the beam of electromagnetic radiation to form modulated electromagnetic radiation comprising a signal, and transmit the modulated electromagnetic radiation to a receiver so as to communicate the signal to the receiver.

Figure 6A:
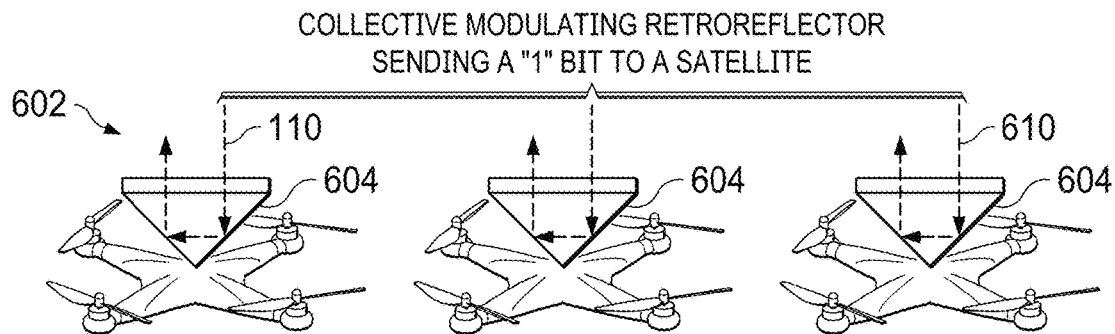
FIGS. 6A and 6B illustrate a communication embodiment wherein the drones transmit information by acting as a collective modulating retroreflector, each drone including a reflective half-cube or prism and a modulator modulating attenuation of the beam through a layer according to the bit sequence in the signal, so that the layer is (1) transparent to allow retroreflection to a satellite when sending a "1" bit (FIG. 6A) or (2) opaque to block or absorb the retroreflection when sending a "0" bit (FIG. 6B).
Figure 6B:
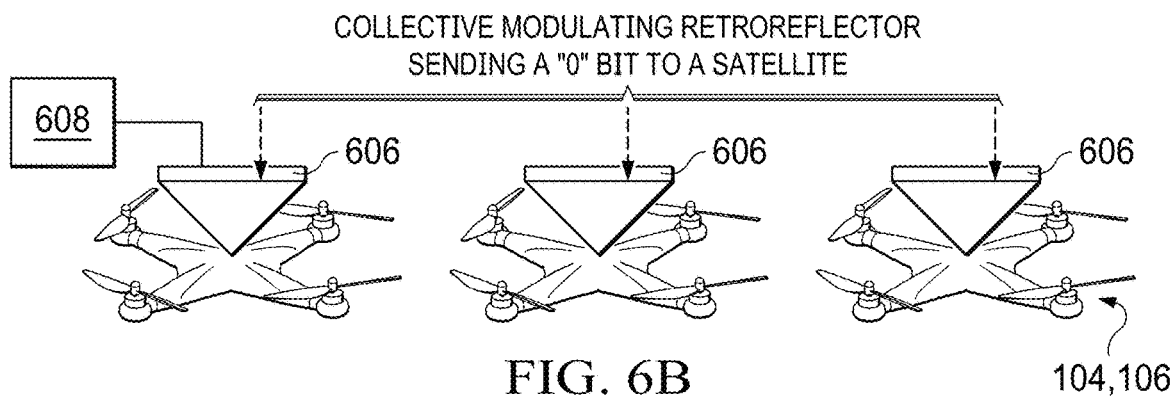

FIGS. 6A and 6B illustrate an example wherein the signal comprises at least one of a "1" bit or a "0" bit and the modulator modulates attenuation of the beam to send the signal. The modulator comprises a corner reflector 604; a layer 606 coupled to the corner reflector and having a variable transparency for the electromagnetic radiation; and an actuator. The actuator 608 modulates a transparency of the layer so that:

the layer is transparent to the electromagnetic radiation when sending the "1" bit so that the electromagnetic radiation 110 from the transmitter is transmitted through the layer and retroreflected 610 from the corner reflector back through the layer to the receiver (as shown in FIG. 6A), and opaque to the electromagnetic radiation when sending the "0" bit, so that the electromagnetic radiation from the transmitter is blocked from the corner reflector by the layer (as shown in FIG. 6B).

In one or more examples, the layer comprises quantum wells and the actuator modulates a voltage across quantum wells to vary the transparency of the layer between transparent and opaque.

Figure 7A:
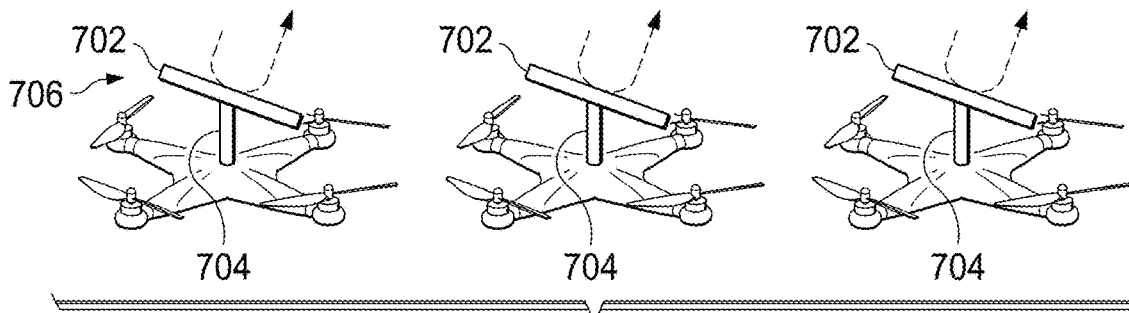
FIGS. 7A and 7B illustrate a communication embodiment wherein the drones transmit information by acting as a collective modulating retroreflector, each drone including a modulating retroreflector including a flat adjustable reflector, and modulating the beam is accomplished by changing the angle of the reflector so that the signal is reflected directly back to the source when sending a "1" bit, as shown in FIG. 7A, and then directed away from the source when sending a "0" bit (FIG. 7B).
Figure 7B:
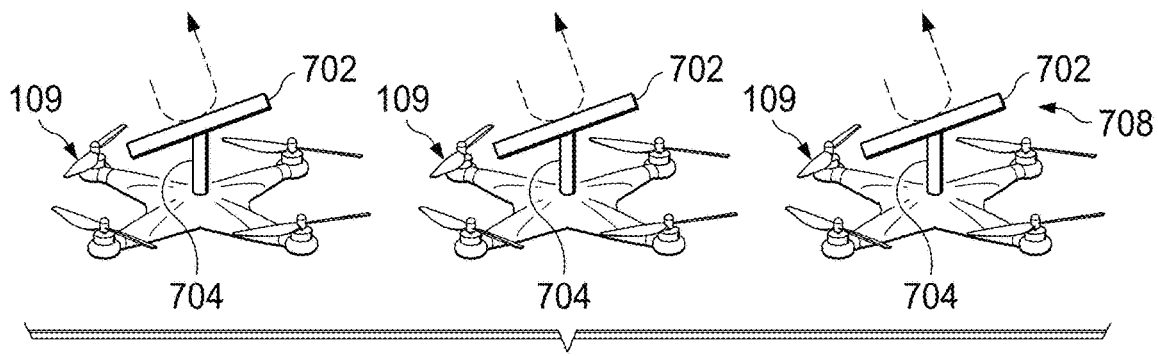

FIGS. 7A and 7B illustrate an example wherein the modulator comprises a reflector 702 mounted on a mount 704 and the mount orients or steers the reflector between:

a first position 706 or orientation reflecting the electromagnetic radiation 110 from the transmitter to the receiver when sending the "1" bit (FIG. 7A), and a second position 708 or orientation reflecting the electromagnetic radiation from the transmitter away from the receiver when sending the "0" bit (FIG. 7B). In one or more examples, the each drone can reflect at a different angle so to as scatter or direct the electromagnetic radiation in a direction that cannot be picked up by an adversary.

In one or more examples, both the receiver and the transmitter are at the same location (e.g., on a satellite). In other examples, the transmitter and receiver are at different locations.

2. Drone Coordinated Energy Harvesting

FIGS. 8A-8C and 9A-9C illustrate a system 800 for energy harvesting comprising a set of transmitter drones 802 and a plurality of elements 900 each mounted to a different one of the transmitter drones. A computer coupled to the drones coordinates the set of transmitter drones to (1) receive solar energy 804 (electromagnetic radiation 806 outputted from the sun 808) on the elements, and (2) transmit, from the elements, at least a portion 810 of the solar energy to a device 812 on a receiver drone 814, the device including at least one of a photovoltaic device 816 or a first thermoelectric module 818. The device converts the at least a portion of the solar energy to electrical power with increased efficiency.

Figure 8A:
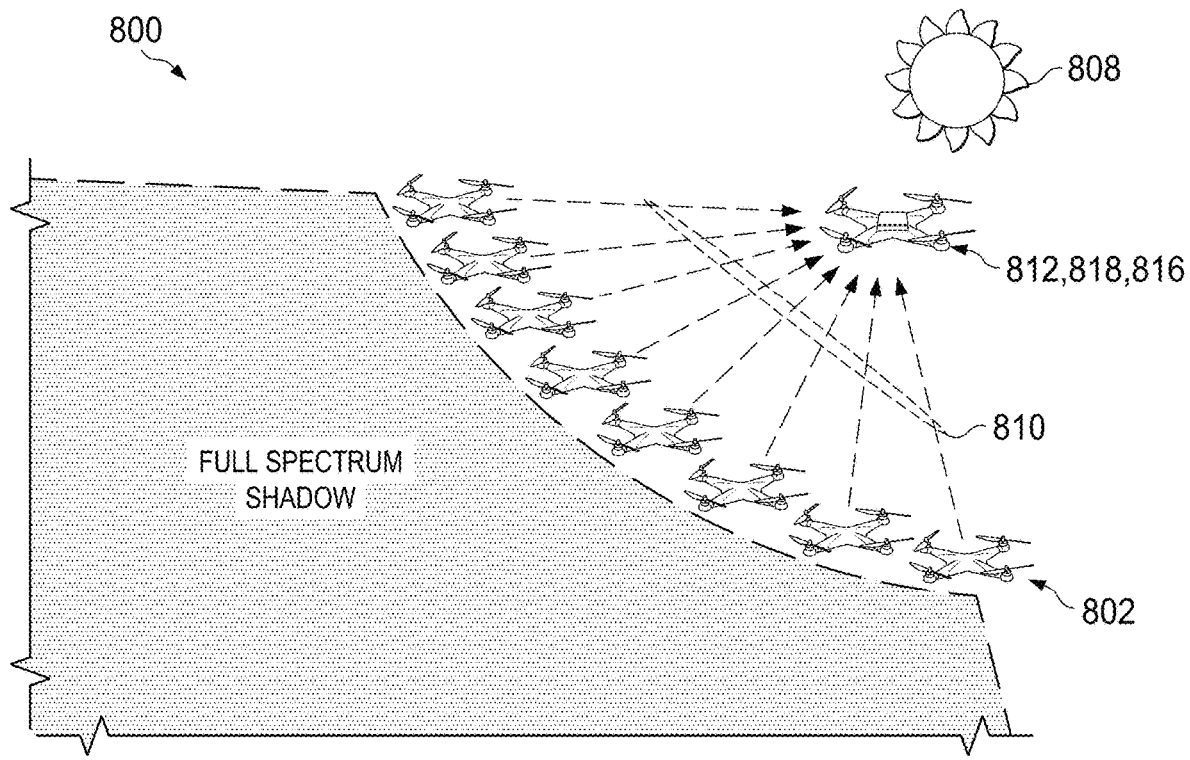
FIG. 8A illustrates a drone configuration for energy harvesting according to a first example, wherein flat reflectors mounted on each of the drones reflect substantially all the sunlight to a solar cell or thermoelectric device, casting a shadow which may be unwanted in some circumstances and wasting some energy because not all the incident sunlight is converted to electrical power by the solar cell or thermoelectric device.
Figure 9A:
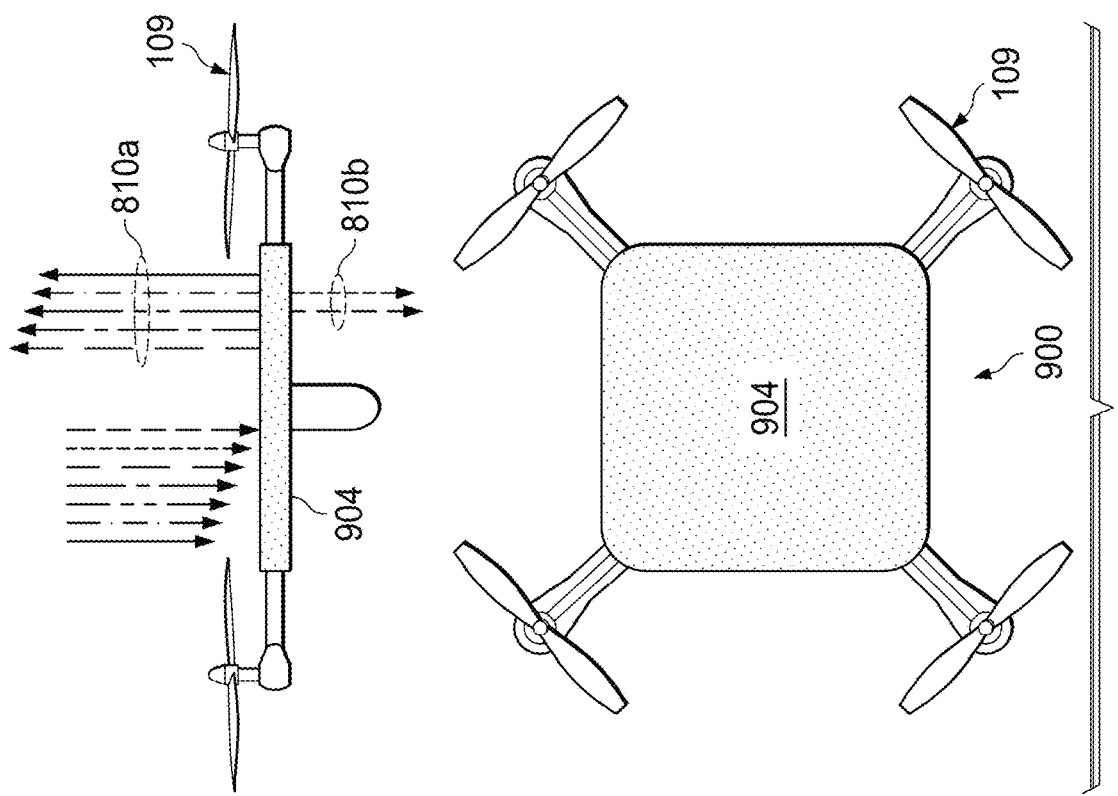
FIG. 9A illustrates a side and top view of a drone in the configuration of FIG. 8A.

FIGS. 8A and 9A illustrate an example wherein each of the elements 900 comprise a reflector 902 reflecting a portion 810 of the solar energy to the receiver drone 814. In one example, a photovoltaic device and a thermoelectric module are mounted to the receiver drone and the reflector reflects a first portion 810a of the solar energy to the photovoltaic device and a second portion 810b of the solar energy to the thermoelectric module. The photovoltaic device converts the first portion of solar energy to first electric power and the thermoelectric module converts the second portion of solar energy to the second electric power.

Figure 8B:
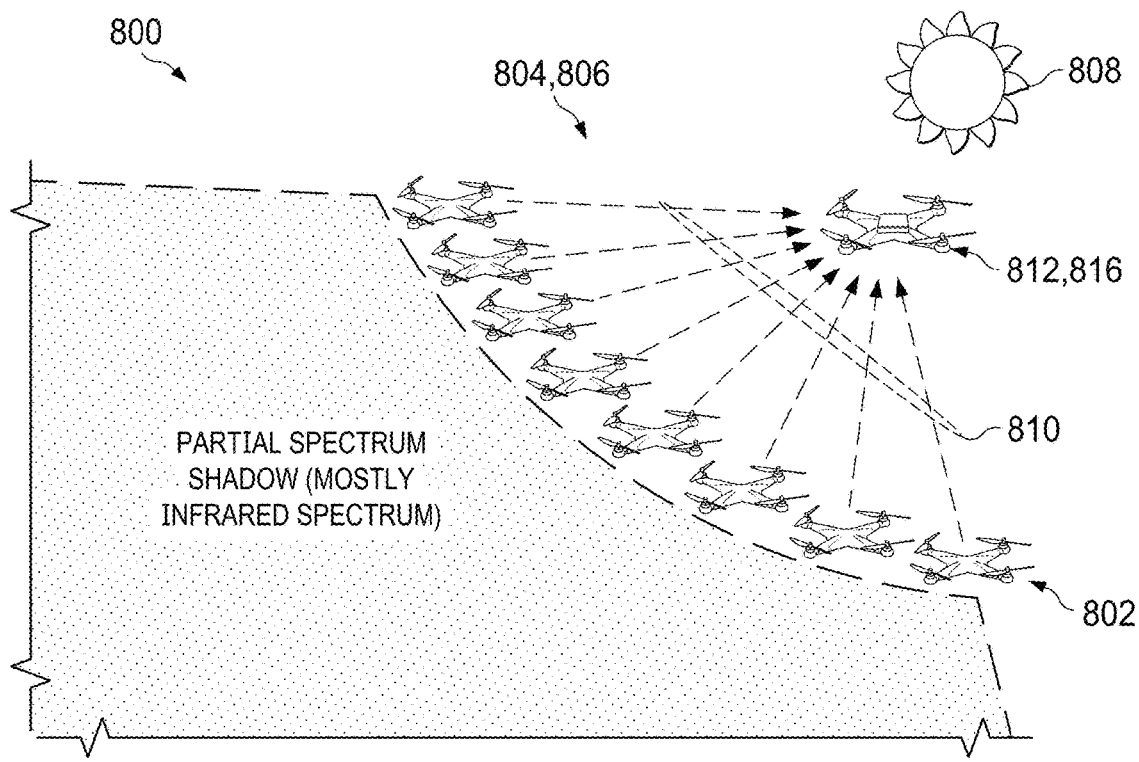
FIG. 8B illustrates drone configuration for energy harvesting according to a second example, wherein a hybrid reflector/transmissive element is mounted to each drone, the hybrid element (e.g., dichroic mirror) only reflects the wavelength band converted by the solar cell to electrical power (the hybrid element passing or transmitting the remainder of the wavelengths so that shadow cast is reduced as compared to the example of FIG. 8A.
Figure 9B:
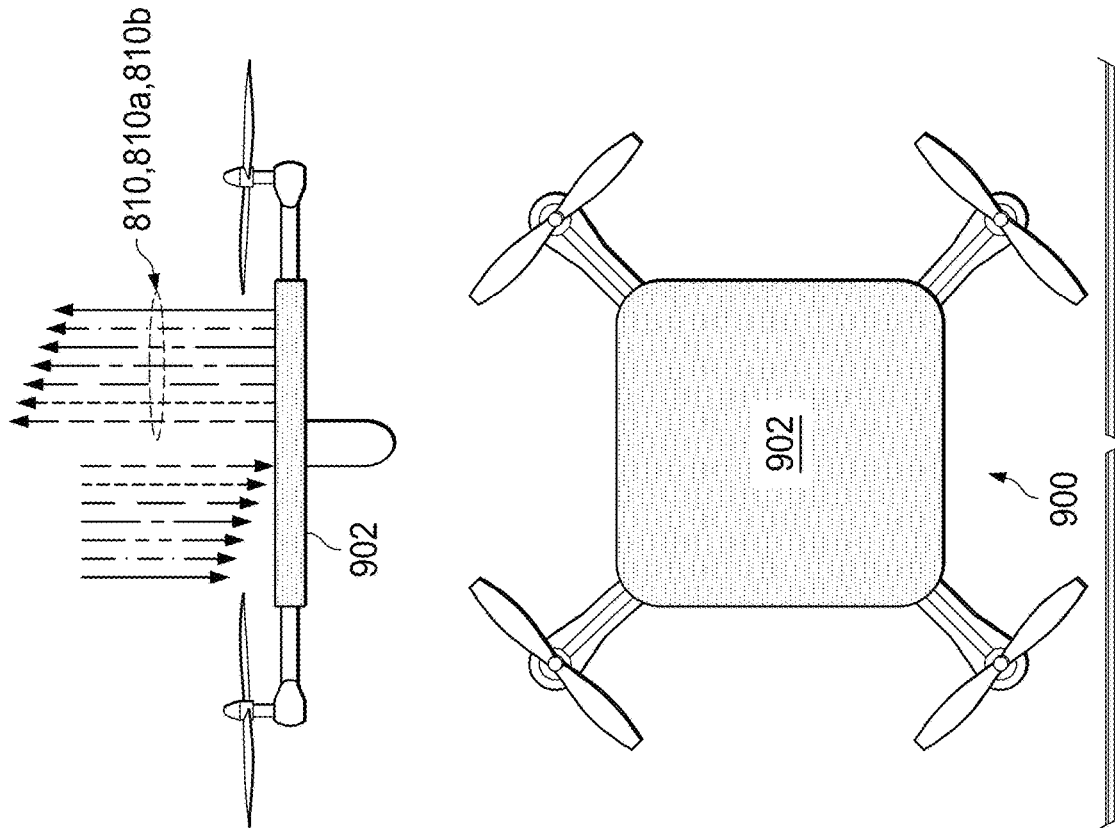
FIG. 9B illustrates a side and top view of a drone in the configuration of FIG. 8B.

FIGS. 8B and 9B illustrate an example wherein the elements each comprise a hybrid element 904 (e.g., dichroic filter or dichroic mirror) comprising a reflector and a transmissive element. In one variation, the receiver drone includes a photovoltaic device and the reflector reflects a first portion 810a of the solar energy comprising first wavelengths that are converted to the electrical power by the photovoltaic device. The transmissive element transmits a second portion 810b of the solar energy comprising second wavelengths not substantially converted to the electric power by the photovoltaic device, so that the second portion is transmitted away from the photovoltaic device on the receiver drone.

Figure 8C:
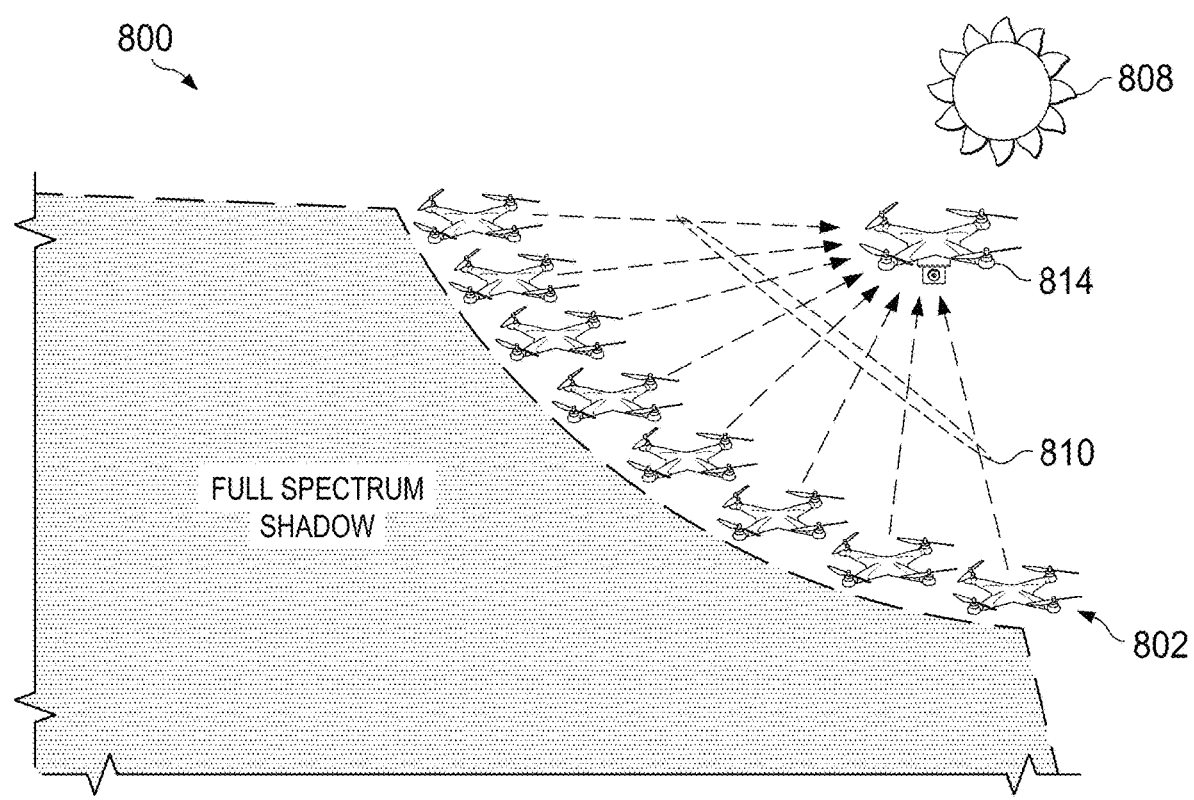
FIG. 8C illustrates a drone configuration for energy harvesting according to a third example, including hybrid elements as in FIG. 8B and further wherein a thermoelectric module is placed on the underside of each of the drones, and the infrared (IR) portion of the sunlight that is transmitted by the hybrid elements is absorbed by the thermoelectric module to generate electricity.
Figure 9C:
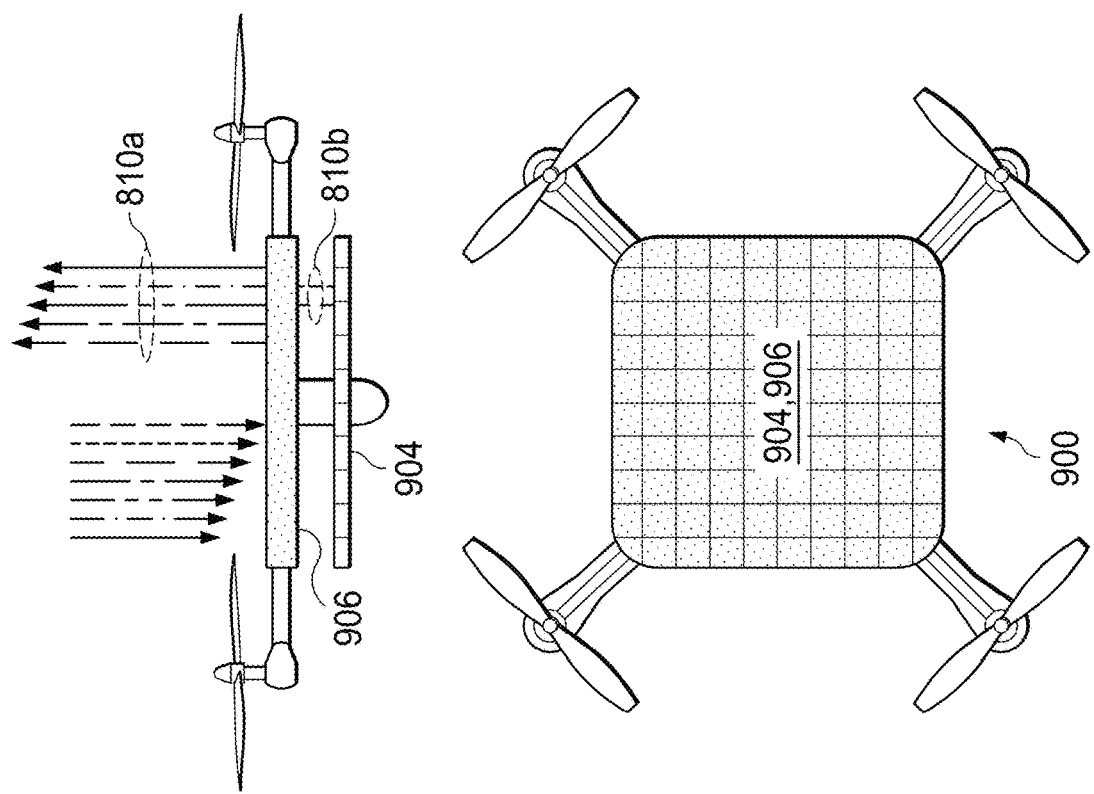
FIG. 9C illustrates a side and top view of a drone in the configuration of FIG. 8C.

FIGS. 8C and 9C illustrate an example wherein a thermoelectric module 906 is mounted to each of the drones and each of the elements comprise a hybrid element comprising a reflector and a transmissive element between the reflector and the thermoelectric module 906. The receiver drone includes a photovoltaic device. The reflector reflects a first portion 810a of the solar energy comprising first wavelengths that are converted to the electrical power by the photovoltaic device, and the transmissive element transmits a second portion 810b of the solar energy to the thermoelectric module on each of the drones so that the thermoelectric module on each of the drones converts the second portion of solar energy to second electric power. The second portion of solar energy comprises second wavelengths not substantially converted to the electric power by the photovoltaic device on the receiver. The second portion of solar energy transmitted to the thermoelectric module heats a top side of the thermoelectric module and the bottom side of the thermoelectric module stays cool due to exposure to the surrounding air. The resulting temperature differential across the thermoelectric module is used to produce the electrical power.

The reflectors can be mounted on mounts as illustrated in FIGS. 2A-2C and described for the communications configuration (section 1a). Specifically, the elements 900 comprise a plurality of reflective surfaces 202 of reflectors 902, each of the reflective surfaces 202 mounted on a mount 204 to a different one of the transmitter drones. The computer controls an orientation of each of the reflective surfaces relative to the each of the transmitter drones via an actuator and the mount 204, and each of the reflective surfaces reflect a portion of the solar energy to the device on the receiver drone as described herein.

3. Drone Coordinated Camouflage

Figure 10B:
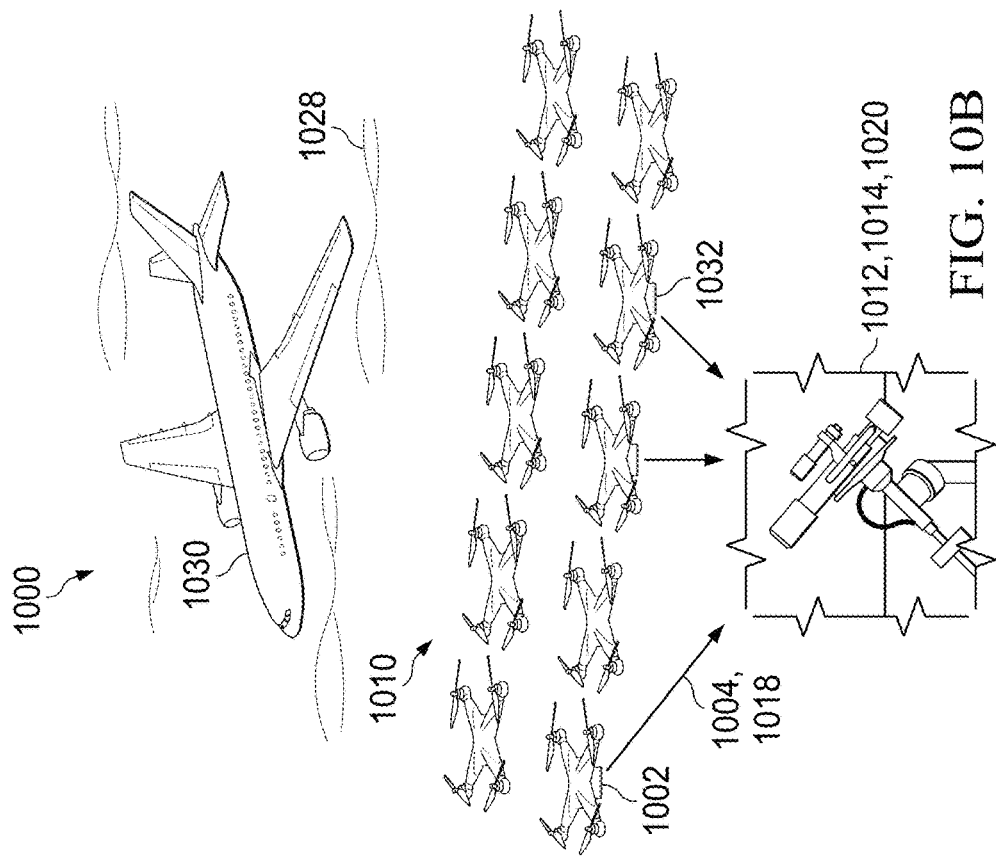
FIG. 10B illustrates drones creating a dynamic camouflage for an object in the sky.
Figure 10A:
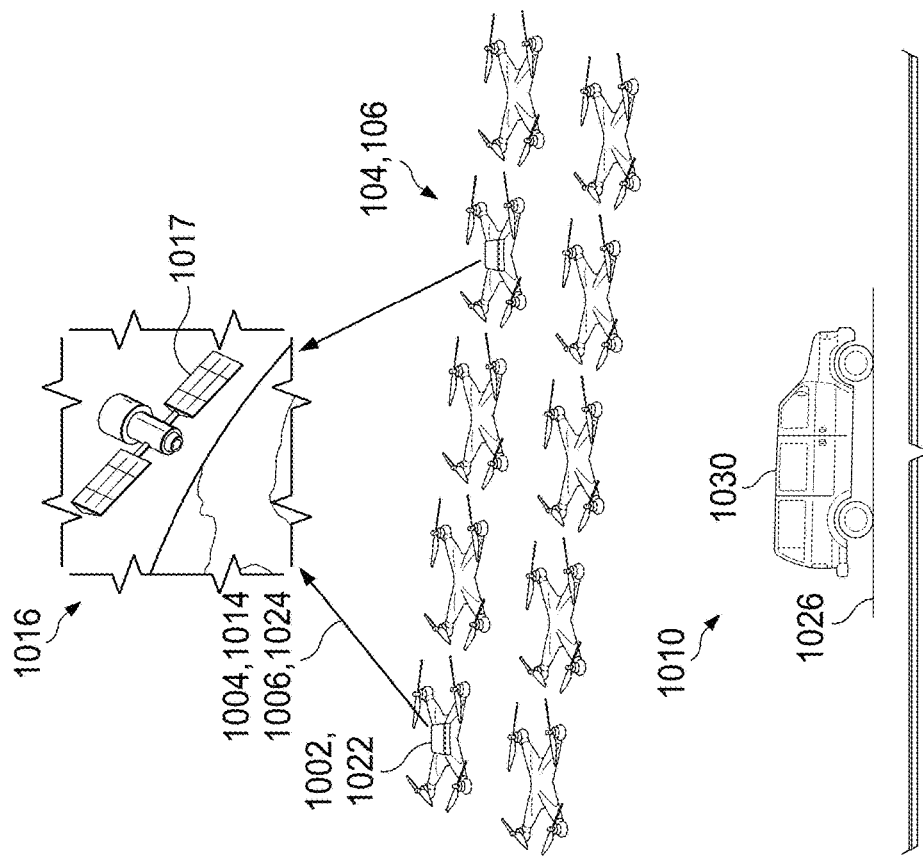
FIG. 10A illustrates drones creating a dynamic camouflage for an object or persons on the ground.
Figure 10D:
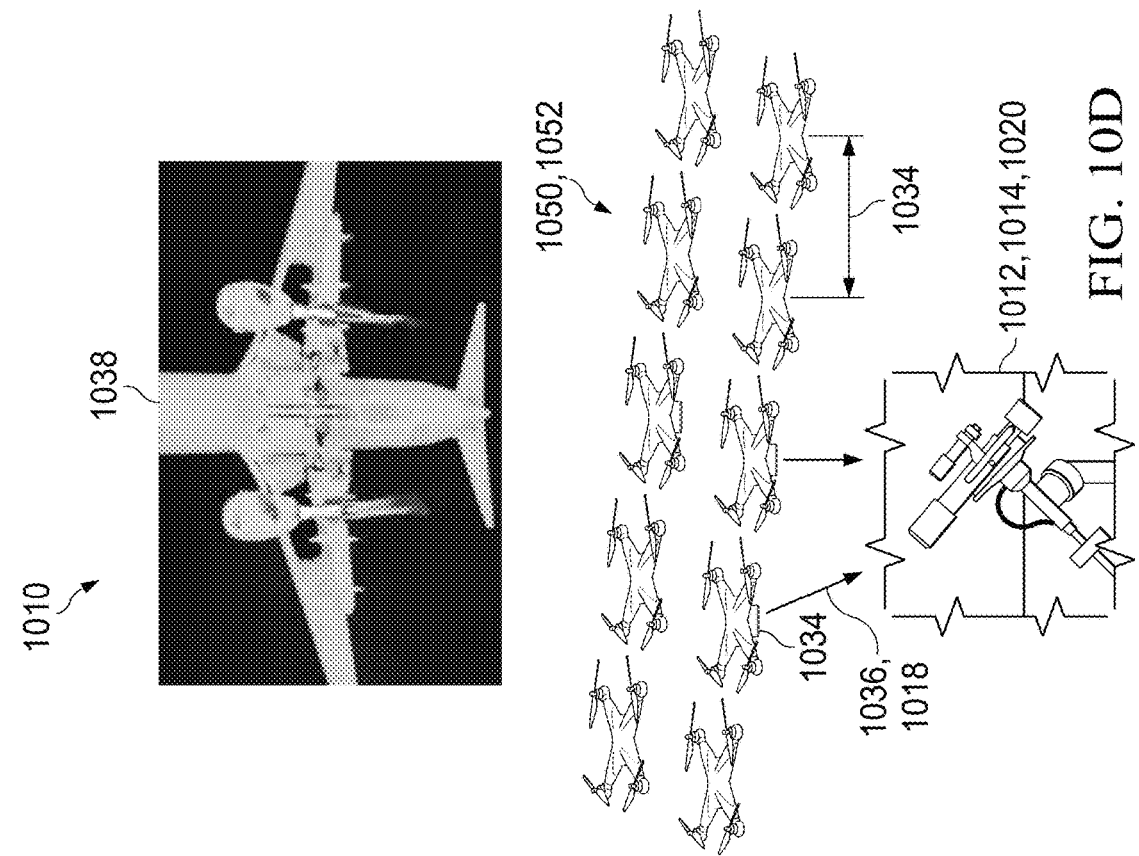
FIG. 10D illustrates drones creating an infrared block for an object in the sky.
Figure 10C:
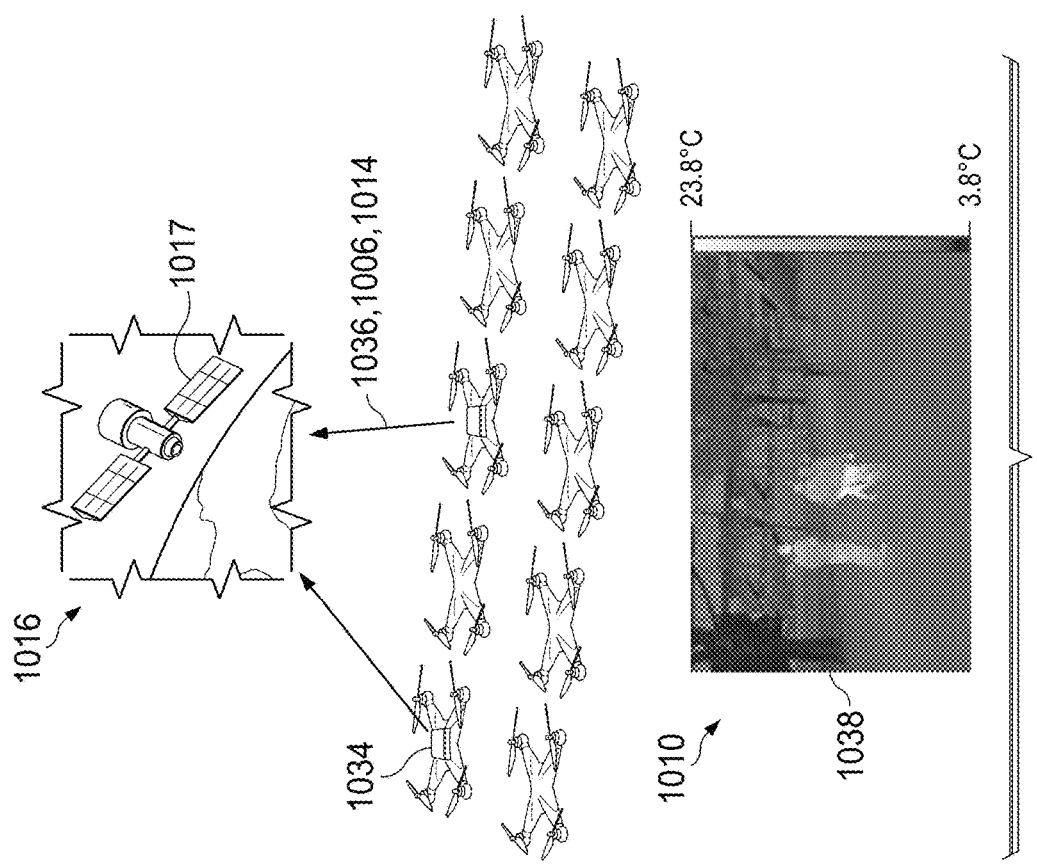
FIG. 10C illustrates drones creating an infrared block for ground personnel or moving vehicles.

FIG. 10A-10D illustrate a system 1000 for camouflaging comprising a set 104 of drones 106 and one or more sources 1002 of radiation 1004 each mounted to a different one of the drones. A computer coupled to the drones coordinates (1) positioning of the set of drones and (2) a transmission or emission of the radiation 1004 from each of the drones in one or more directions 1006 so that the radiation camouflages a region 1010 above or below the drones from a detection 1012 by a detector (e.g., camera 1032). FIGS. 10A and 10C illustrate the example wherein the directions 1006 include a first direction 1014 above the drones, so that the radiation camouflages a region 1016 below the drones from the detection 1012 (e.g., by a satellite 1017 or aircraft) from above the drones. FIG. 10B and FIG. 10D illustrate the example wherein the directions include a second direction 1018 below the drones, so that the radiation camouflages the region above the drones from a detection from below the drones (e.g., by a ground installation 1020).

a. Color Camouflage

FIG. 10A and FIG. 10B illustrate an example wherein the sources of radiation comprise a first source 1022 emitting the radiation comprising visible light 1024 used to camouflage the region 1010. In one example, the visible light 1024 has a color of a ground 1026 or sky 1028 on/in which an object 1030 (e.g., vehicle or aircraft) or persons in the region might be located, so that the object is obscured (camouflaged) from the detection by the visible light 1024. Example colors include, but are not limited to, blue to simulate the sky and green to simulate grass. In or more examples, the color is known ahead of time and is called up from memory on the computer. In yet further examples, a camera 1032 connected to the drones or a satellite in communication with the drones provide an image of the region used by the computer to determine the color. In various examples, the sources comprise one or more light emitting diodes (e.g., arranged in a display).

b. Thermal Camouflage

FIG. 10C and FIG. 10D illustrate an example wherein the sources include a second source 1034 emitting the radiation comprising infrared radiation 1036 that has a different thermal signature than the region 1010 being camouflaged so that the region being camouflaged appears to have a different temperature 1038 to the detection than the region actually has.

In one example, the sources (e.g., a thermoelectric device) output the radiation having a first thermal signature of a cold body, so that the region being camouflaged by the drones appears colder to the detection than the region actually is. In another example, the sources output the radiation having a second thermal signature of a hot body, so that the region being camouflaged by the drones appears hotter to the detection than the region actually is.

c. Motion Camouflage

In one or more examples, the source of radiation provide motion camouflage to mimic or simulate motion in the region being camouflaged that is actually not present. In one example, the LED display outputs electromagnetic radiation mimicking or simulating long grass being blown around in the region being camouflaged.

c. Example Mounting Configuration

Figure 11A:
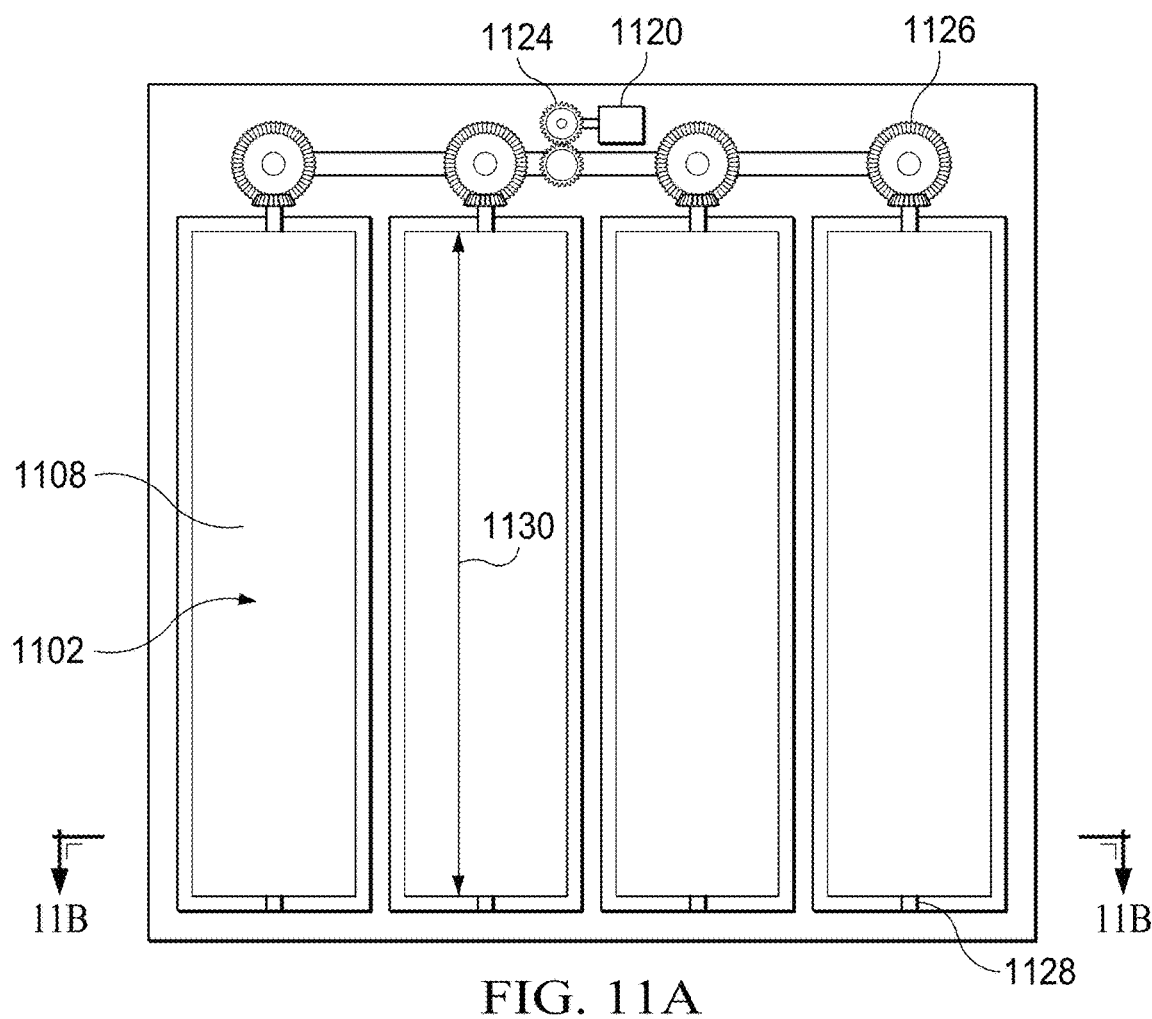
Figure 11B:
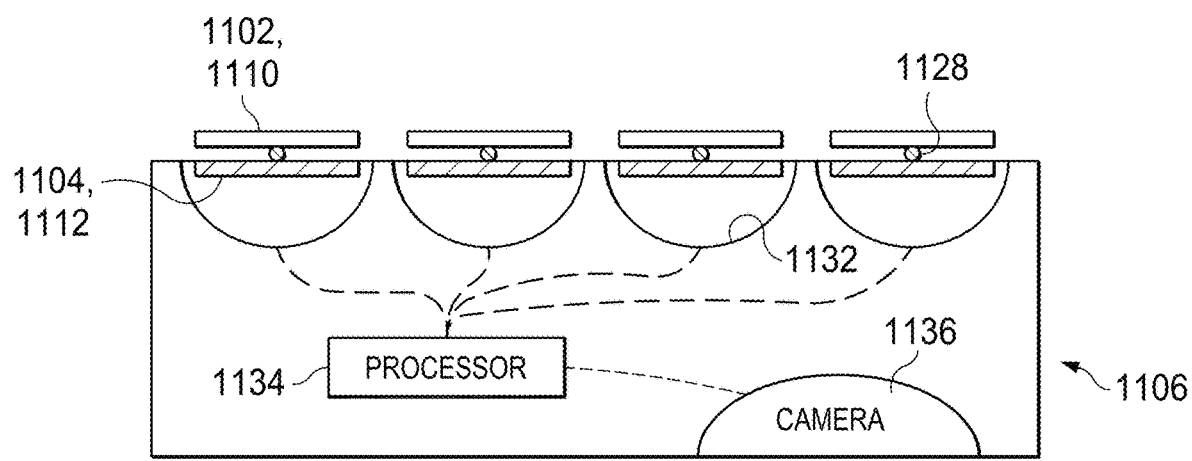
Figure 11C:
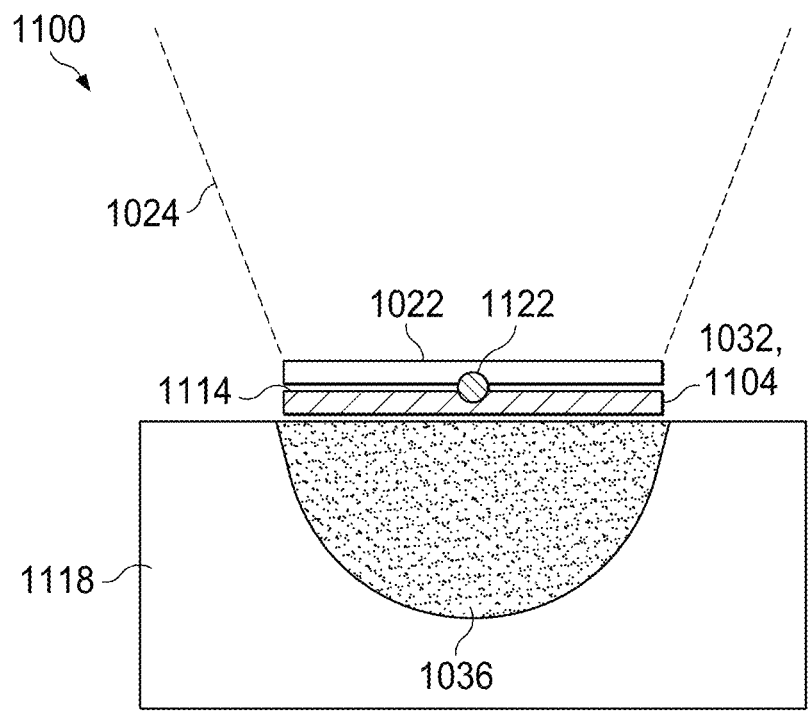
Figure 11D:
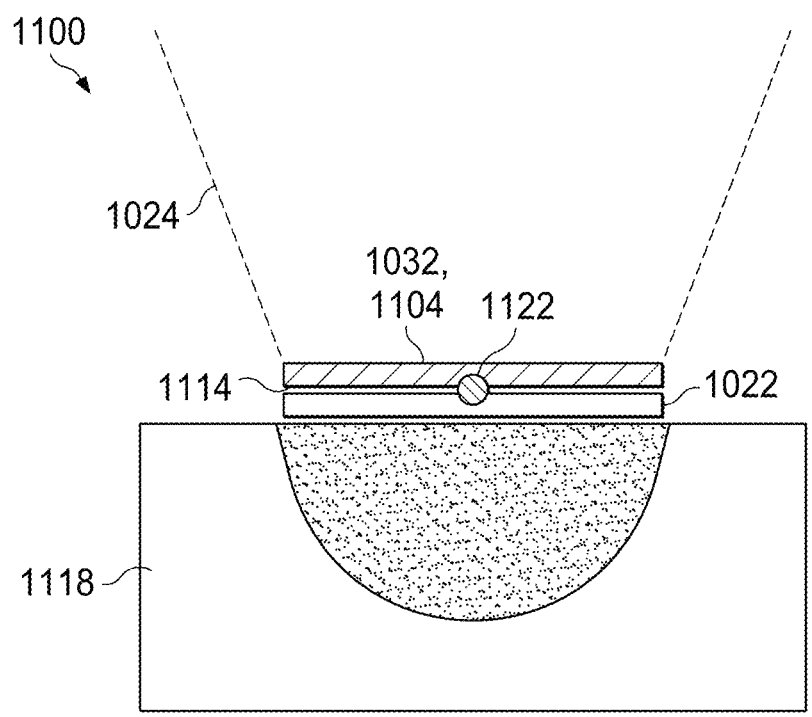

FIGS. 11A and 11B illustrate an example wherein the sources 1002 comprise paired sources 1100 mounted on the drones. Each paired source 1100 includes a first source 1022 (an LED display 1102) emitting the visible light 1024, and a second source 1034 comprising the thermoelectric device 1104 emitting the infrared radiation 1036.

Each of the drones in the set of drones include a mount 1106 mounting one or more paired sources 1100. The mount orients:

(1) the LED display in the paired source to emit the visible light 1024 having the color of the region 1010 being camouflaged, or the color of the region in which the object is located, so that the region or the object is obscured (camouflaged) from the detection by the visible light, or (2) the thermoelectric device 1104 (e.g., a Peltier element) to emit the infrared radiation having the first thermal signature of the cold body or the second thermal signature of the hot body used to provide camouflage.

FIG. 10B further illustrate the mount comprises a panel 1108. The LED display 1102 (comprising a plurality of LEDs) is attached to a first side 1110 the panel and the thermoelectric device 1104 attached to a second side 1112 of each of the panels, wherein the first side is opposite the second side. In various examples, the cold surface 1114 of the thermoelectric device is thermally coupled to the LED display 1102 so as to cool the LED display.

The mount 1106 further comprises a shaft 1116 connected to the panel and a base 1118. An electric motor 1120 is coupled to the shaft 1122 via a gearing system (e.g., spur gears 1124 and screw level gears 1126) and mini slip rings 1128 (e.g., MC 088). The computer instructs the electric motor to rotate the shaft about a longitudinal axis 1130 to switch (e.g., toggle) between a first mode (wherein the LED display emits the visible light to provide the camouflage) and a second mode (wherein the thermoelectric device emits the infrared radiation to camouflage). The shaft positions the panel above a cavity 1132 or opening dimensioned and shaped to accommodate (or make room for) the panel during rotation of the panel between the first mode and the second mode and/or when the panel is still. In this way, the panel does not protrude significantly (if at all) from the drone's body, thereby preventing detrimental air drag to motion of the drones while providing camouflage. In some examples, after the panel is rotated into place in the first mode or the second mode, the panel fits flush with the drone's body so that the drone remains aerodynamic. FIG. 11B illustrates the drone further includes a processor 1134 for controlling the orientation of the mount and a camera 1136 to provide an image of the region used by the computer to determine the infrared radiation needed to provide the camouflage.

d. Example Camouflage Configurations

In various examples, the sources of radiation output the radiation having an electromagnetic signature of weather that is different from an actual weather of the region 1010. Example weather includes, but is not limited to, at least one of a storm, a moving warm front, a cold front, a stationary front, an occluded front, rain, fog, or hail.

In one or more further examples, the computer coordinates the positioning of the drones to arrange the drones in one or more layers 1050 or an array comprising one or more rows 1052 of the drones. In one or more examples, a spacing 1054 between adjacent ones of the drones in a row or layer is less than a Rayleigh criterion for a wavelength of the radiation, such that the detection cannot resolve the adjacent drones and the rows or layers appear continuous.

In various examples, the computer arranges the drones to form a screen or display comprising the sources, so that the screen or display displays an image or outputs the radiation having at least one of a wavelength or intensity distribution obscuring the region from the detection. In some examples, the detection of the thermal signature gives an appearance of an object in the region that is actually not there. In another example, the computer coordinates the transmission of the radiation to give the impression that an object is moving in the region being camouflaged. In yet a further example, the sources of radiation on each of the drones output a spinning or swirl pattern of radiation appearing like or simulating the rotating blades of a helicopter. In another example, the sources output radiation simulating (or giving the impression) that the object's temperature is changing over time (e.g., simulating the start of a car engine and its warm-up time).

Hardware Environment

Figure 12:
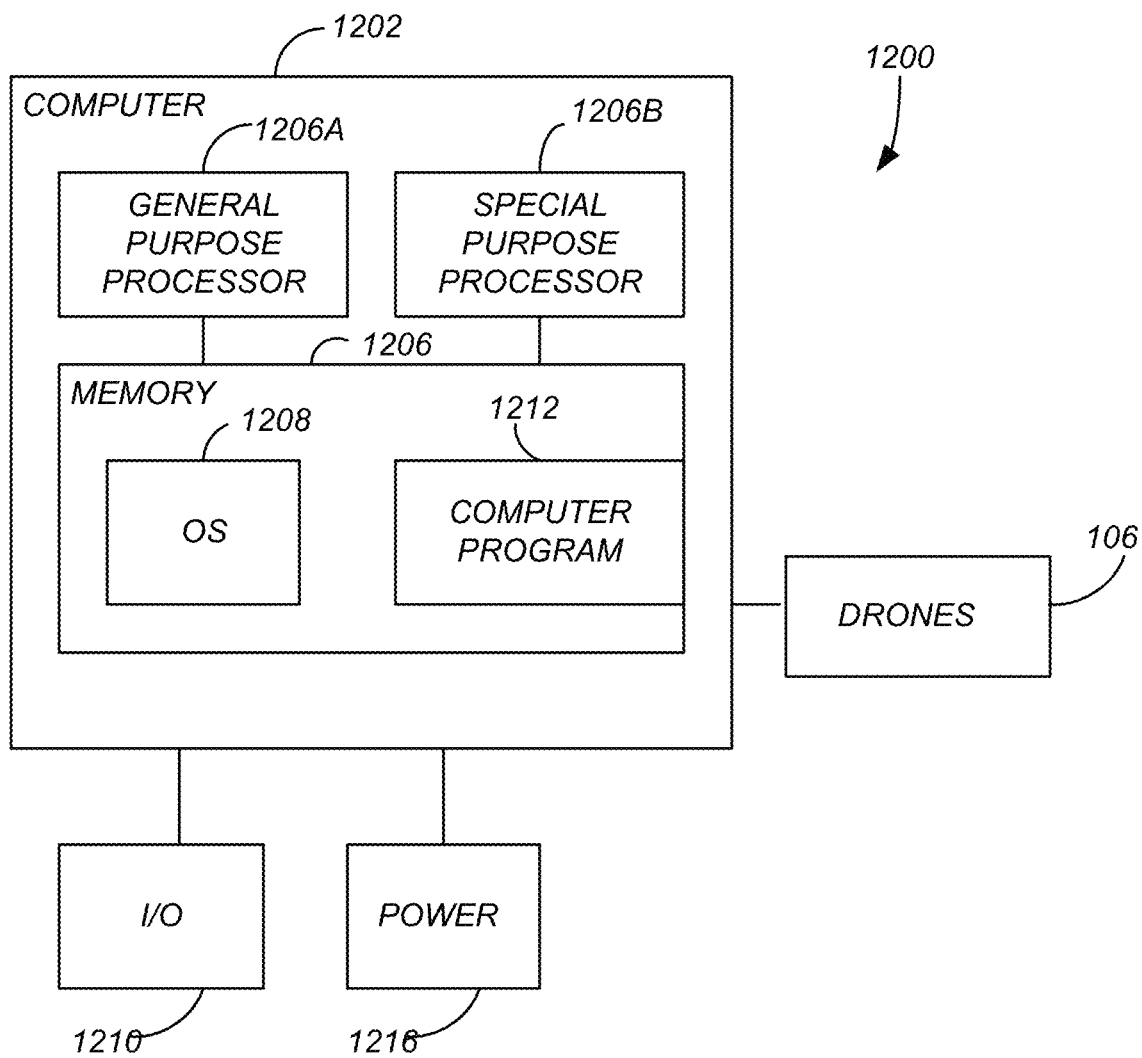
FIG. 12 illustrates a computer system for performing processing functions described herein.

FIG. 12 illustrates an exemplary computer system 1200, 101 that could be used to implement processing elements needed to control, coordinate, or synchronize the drones as described herein. The computer is located remotely and/or on board one of the drones. In various examples, the control system 101a and on board computer on the drone comprise a computer 1200. In various examples, control system 101 comprises a flight controller controlling a flight plan coordinating of each of the drones. In various examples, the flight controller generates flight control signals communicated to propulsion system to cause the drones to move along a flight path at a desired speed. In some examples, the flight control signals are generated based on feedback (e.g., pitch, roll, speed, orientation, direction) from the sensors on the drones.

The computer system comprises a computer 1202 including a processor 1204 (general purpose processor 1204A and special purpose processor 1204B) and a memory, such as random access memory (RAM) 1206. Generally, the computer 1202 operates under control of an operating system 1208 stored in the memory 1206, and interfaces with the user/other computers to accept inputs and commands (e.g., analog or digital signals) and to present results through an input/output (I/O) module 1210. The computer program application 1212 accesses and manipulates data stored in the memory 1206 of the computer 1202. The operating system 1208 and the computer program 1212 are comprised of instructions which, when read and executed by the computer 1202, cause the computer 1202 to perform the operations herein described. In one embodiment, instructions implementing the operating system 1208 and the computer program 1210 are tangibly embodied in the memory 1206, thereby making a computer program product or article of manufacture. As such, the terms "article of manufacture," "program storage device" and "computer program product" as used herein are intended to encompass a computer program accessible from any computer readable device or media.

Example computers 1202 comprise, but are not limited to, one or more field programmable gate arrays (FPGAs), one or more application specific integrated circuits, a laptop, a personal computer, a server computer, distributed network of computers, a cloud computing system, a smart phone, a tablet, or other mobile device.

FIG. 12 further illustrates a power source 1216 for providing power to the computer 1200.

In some examples, the computer comprises a navigation system (including global positioning system) acquiring positioning of a satellite or the sun relative to the drones, in cases where the satellite or the sun comprises the transmitter and the receiver drone includes the receiver, or the satellite comprises the receiver and the transmitter drones comprise the transmitter.

Figure 13:
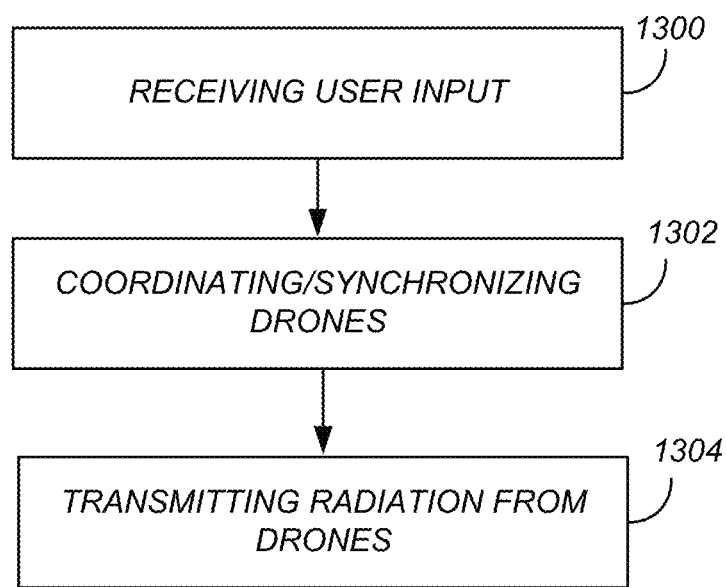
FIG. 13 is a flowchart illustrating a method of communicating, energy harvesting, or camouflaging according to embodiments described herein.

FIG. 13 illustrates a method of communicating, energy harvesting, or camouflaging according to examples described herein, including receiving input from a user 1300 (e.g., calling the drones for a communication, energy harvesting, or camouflage application), coordinating or synchronizing the drones 1302 to perform the application (optionally including receiving feedback from sensors on the drones); and transmitting radiation 1304 from the drones in order to implement the communication, energy harvesting, or camouflage.

Those skilled in the art will recognize many modifications may be made to this configuration without departing from the scope of the present disclosure. For example, those skilled in the art will recognize that any combination of the above components, or any number of different components, peripherals, and other devices, may be used.

Device Embodiments

Embodiments of the present invention include, but are not limited to, the following.

Communication Embodiments

A1. A system (100) for increasing a signal (102) to noise ratio of a communication comprising a signal (102), comprising:
 a set (104) of drones (106);
 a plurality of elements (108), each of the elements (108) mounted to a different one of the drones (106); and
 a computer (101, 302, 1200) coupled to the drones (106), the computer (101, 302, 1200) coordinating the set (104) of drones (106) to:
 receive, on the elements (108), electromagnetic radiation (110) carrying the signal (102) transmitted from a transmitter (112), and
 transmit, from the elements (108), the electromagnetic radiation (110) to a receiver (114), and
 so that the receiver (114) receives the signal (102) having an increased signal to noise ratio.

A2. The system (100) of clause A1, wherein each of the elements (108) comprising a reflector (702), a scattering element (300), a diffractive element (300), or a non-diffractive transmissive element (500).

A3. The system (100) of clause A2, wherein the elements (108) each comprise the reflector (702) having a length (L) and a width (W) at least three times larger than a wavelength of the electromagnetic radiation (110) so as to reduce scattering of the electromagnetic radiation (110) by the reflector (702).

A4. The system (100) of clause A3, wherein the elements (108) each comprise the scattering element (300) and the computer (101, 302, 1200) coordinates the drones (106) so that the elements (108) form a phased array (304) scattering the electromagnetic radiation (110) to form scattered waves (306) that constructively interfere (308) at the receiver (114).

A5. The system (100) of clause A3 or A4, wherein the scattering element (300) comprises an antenna (301).

A6. The system (100) of any of the clauses A3-A5, wherein the scattering element (300):
 has a shape (310) filtering the electromagnetic radiation (110) to form filtered electromagnetic radiation (312), and
 transmits the electromagnetic radiation (110) comprising filtered electromagnetic radiation (312) to the receiver (114).

A7. The system (100) of any of the clauses A3-A6, wherein:
 the electromagnetic radiation (110) comprises a polarization (314) having a first component (316) having a first direction (318) and a second component (320) having a second direction (322), and
 the scattering element (300) has an axis (324) parallel to the first direction (318) and:
 scatters the first component (316) to the receiver (114),
 does not scatter the second component (320) to the receiver (114).

A8. The system (100) of clause A1, wherein the elements (108) each comprise a diffraction grating (400) diffracting the electromagnetic radiation (110) to form one or more diffracted beams (402) transmitted to the receiver (114).

A9. The system (100) of clause A1, wherein the elements (108) each comprise a transmissive element (500) having a different shape (502) and the computer (101, 302, 1200) coordinates the drones (106) so that the elements (108) are assembled to form a lens (506) refracting the electromagnetic radiation (110) onto the receiver (114).

A10. The system (100) of any of the clauses A1-A9, wherein:
 the computer (101, 302, 1200) comprises a navigation system acquiring positioning of a satellite relative to the drones (106),
 the satellite comprises the transmitter (112) and the set (104) of drones (106) comprise a receiver drone comprising the receiver (114), or
 the satellite comprises the receiver (114) and the set (104) of drones (106) comprise a transmitter (112) drone comprising the transmitter (112).

A11. The system (100) of any of the clauses A1-A10, wherein the computer (101, 302, 1200) coordinates the drones (106) to form an array (304) of the drones (106) at positions (116) having coordinates lying on convex surface (118) in a coordinate system, so that the electromagnetic radiation (110) transmitted from the drones (106) is focused on, concentrated on, converged on, or directed to, the receiver (114).

A12. The system (100) of clause A11, wherein the convex surface (118) comprises a paraboloid, an ellipsoid, or a spheroid.

A13. The system (100) of clause A1, A10, A11, or A12 wherein the elements comprise a plurality of reflective surfaces (202), each of the reflective surfaces (202) mounted on a mount (204) to a different one of the drones (106), wherein:
 the computer (101, 302, 1200) controls an orientation (206) of each of the reflective surfaces (202) relative to the each of the drones (106) via an actuator (208) and the mount (204), and
 each of the reflective surfaces (202) reflect a portion (210) of the electromagnetic radiation (110) to the receiver (114).

A14. The system (100) of any of the clauses A1-A14, wherein the computer (101, 302, 1200) adjusts an orientation (206) of one or more of the reflective surfaces (202) or elements to correct for a distortion of a wavefront (122) of the electromagnetic radiation (110) incident on the reflective surfaces (202) or elements.

A15. The system (100) of any of the clauses A13-A14, wherein the computer (101, 302, 1200) coordinates the drones (106) to form an array (304) of the drones (106) at positions (116) wherein the reflective surfaces (202) form or approximate a convex surface (118) focusing, concentrating, directing, or converging the electromagnetic radiation (110) on the receiver (114).

A16. The system (100) of any of the clauses A13-A15, wherein the mount (204) comprises a mechanism (212) adjusting the orientation (206) in two orthogonal directions x and y of a cartesian coordinate system.

A17. The system (100) of any of the clauses A13-A16, wherein the mount (204) comprises a platform (214) and each of the reflective surfaces (202) comprise a surface of a coating or film (216) on the platform (214).

A18. The system (100) of any of the clauses A13-A17, wherein:
the mount (204) is connected to a worm drive (218) comprising a plurality of worms (220),
each of the worms (220) are attached via a socket or joint (230) to the platform (214) to raise or lower a corner (232) or side of the platform (214) to control the orientation (206).

A19. The system (100) of any of the clauses A1-A18, wherein the computer (101, 302, 1200) coordinates the drones (106) into an array (304) of the drones (106) forming a dish shape (310) directing the electromagnetic radiation (110) to the receiver (114).

A20. The system (100) of any of the clauses A1-A19, further comprising a container for storing the set (104) of drones (106).

A21. An apparatus for increasing a signal (102) to noise ratio of a communication comprising a signal (102), comprising:
a set (104) of drones (106), each of the drones (106) having an element (300) configured to:
receive electromagnetic radiation (110) carrying a signal (102) transmitted from a transmitter (112), and
transmit the electromagnetic radiation (110) to a receiver (114), and
so that the receiver (114) receives the signal (102) having an increased signal to noise ratio.

A22. The apparatus of clause A21, wherein the element (300) comprises a reflector (702), a scattering element (300), a diffractive element (300), or a non-diffractive transmissive element (500) element (300).

A23. The apparatus of any of the clauses A21-A22, wherein each of the drones (106) further comprise a mount (204, 704) comprising a mechanism (212) controlling an orientation (206) of the reflector (702) mounted on the mount (204).

A24. The apparatus of clause A23, wherein:
the mount (204) comprises a platform (214), and
the reflector (702) comprises a reflective surface (202) including a surface of a coating or film (216) on the platform (214).

A25. The apparatus of clause A24, further comprising a worm drive (218) comprising a plurality of worms (220), each of the worms (220) attached via a socket or joint (230) to the platform (214) to raise or lower a corner (232) or side of the platform (214) and control an orientation (206) of the reflective surface (202).

A26. The apparatus of any of the clauses A21-A22 implemented in the system of any of the clauses A1-A20.

A27. A method for increasing a signal (102) to noise ratio of a communication comprising a signal (102), comprising:
coordinating a set (104) of drones (106) to:
receive electromagnetic radiation (110) carrying the signal (102) transmitted from a transmitter (112), and
transmit the electromagnetic radiation (110) to a receiver (114) receiving the signal (102); and
so that the receiver (114) receives the signal (102) having an increased signal to noise ratio.

A28. The method of clause A26, further comprising:
acquiring positioning of a satellite relative to the drones (106), wherein:
the satellite comprises the transmitter (112) and the set (104) of drones (106) comprise a receiver drone comprising the receiver (114), or
the satellite comprises the receiver (114) and the set (104) of drones (106) comprise a transmitter (112) drone comprising the transmitter (112); and
adjusting positioning and orientation (206) of the drones (106) to increase the signal to noise ratio.

A29. The method of any of the clauses A27-A28 using the system or method of any of the clauses A1-A26.

A29. A system (600) for communicating, comprising:
a set (104) of drones (106);
a plurality of modulators (602), each of the modulators (602) mounted to a different one of the drones (106); and
a computer (101, 302, 1200, 1202) coupled to the drones (106), the computer (101, 302, 1200) coordinating the set (104) of drones (106) to:
receive, on the modulators (602), electromagnetic radiation (110) carrying a signal (102) transmitted from a transmitter (112), and
modulate the electromagnetic radiation (110) using the modulators (602) to form modulated electromagnetic radiation (110) comprising a signal (102), and
transmit the modulated electromagnetic radiation (110) to a receiver (114) so as to communicate the signal (102) to the receiver (114).

A30. The system (600) of clause A29, wherein:
the signal (102) comprises at least one of a "1" bit or a "0" bit,
the modulators (602) each comprise a corner reflector (604); a layer (606) coupled to the corner reflector (604) and having a variable transparency for the electromagnetic radiation (110); and an actuator (608) modulating a transparency of the layer (606) so that:
the electromagnetic radiation (110) from the transmitter (112) is transmitted through the layer (606) and retroreflected (610) from the corner reflector (604) back through the layer (606) to the receiver (114) when sending the "1" bit, and
the electromagnetic radiation (110) from the transmitter (112) is attenuated by the layer (606) and blocked from the corner reflector (604) when sending the "0" bit.

A31. The system (600) of clause A30, wherein:
the signal (102) comprises at least one of a "1" bit or a "0" bit,
the modulators (602) each comprise a reflector (702) mounted on a mount (204, 704), wherein the mount (704) orients the reflector (702) between:
a first position (706) reflecting the electromagnetic radiation (110) from the transmitter (112) to the receiver (114) when sending the "1" bit, and
a second position (708) reflecting the electromagnetic radiation (110) from the transmitter (112) away from the receiver (114) when sending the "0" bit.

A32. An apparatus, comprising:
a set (104) of drones (106);
a plurality of elements (108) transmitting and/or modulating electromagnetic radiation (110), each of the elements (108) mounted to a different one of the drones (106); and
a computer (101, 302, 1200) coupled to the drones (106), the computer (101, 302, 1200) coordinating the set (104) of drones (106) into an array (304) forming a spatial light modulator, a satellite dish, or solar concentrator.

A33. A satellite dish that is large, highly mobile, can be rapidly deployed, and automatically oriented. The dish is composed of a coordinated swarm of aerial drones equipped with adjustable reflectors so that each drone transports a small portion of the dish, thereby eliminating the need of a large vehicle to transport the dish. All but one of the airborne drones coordinate with one another to form a parabolic shape, while one of the drones (the queen) flies to the focal point of the parabolic shape. It is at this focal point that the queen drone can receive signals, transmit signals, or provide a secondary reflective surface to pass the signal to or from a third entity such as a human or ground vehicle. The angle of this dish formed by the drones can be automatically adjusted through coordinated action amongst the drones, so the need for manual labor is eliminated.

A34. A synchronized unmanned aerial vehicle (UAV) system for concentrating signals including a plurality of reflector UAVs, each reflector UAV comprising an adjustable reflector; a receiver UAV; and a control unit configured to (i) coordinate movement of the plurality of reflector UAVs and the receiver UAV such that the reflector UAVs form a satellite dish (e.g., having a substantially parabolic, spheroidal, or ellipsoidal shape) and the focal receiver is positioned at a focal point of the formed satellite dish and (ii) adjust the adjustable reflectors of the reflector UAVs such the each reflector reflects a signal toward the receiver UAV.

Energy Harvesting Embodiments

B1. A system (800) for energy harvesting, comprising:
a set of transmitter drones (802);
a plurality of elements (900), each of the elements (900) mounted to a different one of the transmitter drones (802); and
a computer (1202) coupled to the transmitter drones (802), the computer (1202) coordinating the set of transmitter drones (802) to:
receive solar energy (804) on the elements (900),
transmit, from the elements (900), at least a portion (810) of the solar energy (804) to a device (812) on a receiver drone (814), the device (812) including at least one of a photovoltaic device (816) or a first thermoelectric module (818), and
so that the device (812) converts the at least a portion (810) of the solar energy (804) to electrical power with increased efficiency.

B2. The system (800) of clause B1, wherein each of the elements (900) comprise at least one of a reflector (902), a transmissive element, or a second thermoelectric module (906).

B3. The system (800) of clause B1, wherein the elements (900) each comprise a reflector (902).

B4. The system (800) of clause B3 or B2, wherein:
the reflector (902) reflects a first portion (810a) of the solar energy (804) and a second portion (810b) of the solar energy (804) to the device (812),
the electric power comprises first electric power and second electric power,
the device (812) comprises the photovoltaic device (816) converting the first portion (810a) of the solar energy (804) to the first electric power, and
the device (812) comprises first thermoelectric module (818) converting the second portion (810b) of the solar energy (804) to the second electric power.

B5. The system (800) of claim 1, wherein:
the elements (900) each comprise a hybrid element (904) comprising a reflector (902) and a transmissive element,
the reflector (902) reflects a first portion (810a) of the solar energy (804) comprising first wavelengths that are converted to the electrical power by the photovoltaic device (816),
the transmissive element transmits a second portion (810b) of the solar energy (804) comprising second wavelengths not substantially converted to the electric power by the photovoltaic device (816), so that the second portion (810b) is transmitted away from the photovoltaic device (816).

B5. The system (800) of clause B5, wherein the hybrid element (904) comprises a dichroic filter.

B6. The system (800) of any of the clause B1-B5, wherein:
each of the elements (900) comprise a hybrid element (904) comprising a reflector (902), a second thermoelectric module (906), and a transmissive element between the reflector (902) and the second thermoelectric module (906),
the reflector (902) reflects a first portion (810a) of the solar energy (804) comprising first wavelengths that are converted to the electrical power by the photovoltaic device (816),
the transmissive element transmits a second portion (810b) of the solar energy (804) to the second thermoelectric module (906), the second thermoelectric module (906) converting the second portion (810b) of the solar energy (804) to second electric power, and
the second portion (810b) of the solar energy (804) comprises second wavelengths not substantially converted to the electric power by the photovoltaic device (816).

B7. The system (800) of any of the clauses B1-B6, wherein the computer (1202) comprises a navigation system acquiring positioning of a Sun, outputting the solar energy (804), relative to the transmitter drones (802).

B8. The system (800) of any of the clauses B1-B7, wherein the computer (1202) coordinates the transmitter drones (802) to form an array of the transmitter drones (802) at positions having coordinates lying on convex surface (118) in a coordinate system, so that the at least a portion (810) of the solar energy (804) transmitted from the transmitter drones (802) is focused on, concentrated on, converged on, or directed to, the device (812) on the receiver drone (814).

B9. The system (800) of clause B8, wherein the convex surface (118) comprises a paraboloid, an ellipsoid, or a spheroid.

B10. The system (800) of any of the clauses B1-B9, wherein:
the elements (900) comprise a plurality of reflective surface (202)s, each of the reflective surfaces (202) mounted on a mount (204) to a different one of the transmitter drones (802).

the computer (1200, 1202) controls an orientation (206) of each of the reflective surfaces (202) relative to the each of the transmitter drones (802) via an actuator (208) and the mount (204), and each of the reflective surfaces (202) reflect a portion (810) of the solar energy (804) to the device (812) on the receiver drone (814).

B11. The system (800) of clause B10, wherein the computer (1202) coordinates the transmitter drones (802) to form an array of the transmitter drones (802) at positions wherein the reflective surfaces (202) form or approximate a convex surface (118) or a dish shape focusing, concentrating, directing, or converging the solar energy (804) on the device (812) on the receiver drone (814).

B12. The system (800) of clause B10 or B11, wherein the mount (204) comprises a mechanism (212) adjusting the orientation (206) in two orthogonal directions x and y of a cartesian coordinate system (800).

B13. The system (800) of clause B10, B11, or B12, wherein the mount (204) comprises a platform (214) and each of the reflective surfaces (202) comprise a surface of a coating or film (216) on the platform (214).

B14. The system (800) of clause 13, wherein:
the mount (204) is connected to a worm drive (218) comprising a plurality of worms (220),
each of the worms (220) are attached via a socket or joint (230) to the platform (214) to raise or lower a corner (232) or side of the platform (214) to control the orientation (206).

B15. An apparatus for energy harvesting, comprising:
a set of transmitter drones (802);
a receiver drone (814);
a plurality of elements (900), each of the elements (900) mounted to a different one of the transmitter drones (802) so as to:
receive solar energy (804), and
transmit at least a portion (210, 810) of the solar energy (804) to a device (812) on the receiver drone (814), the device (812) including at least one of a photovoltaic device (816) or a first thermoelectric module (818); and
so that the device (812) converts the at least a portion (810) of the solar energy (804) to electrical power with increased efficiency.

B16. The apparatus of clause B15, wherein each of the transmitter drones (802) further comprise a mount (204) comprising a mechanism (212) controlling an orientation (206) of each of the elements (900) mounted on a mount (204).

B17. The apparatus of clause B16, wherein:
the mechanism (212) comprises a platform (214) and a worm drive (218) comprising a plurality of worms (220), each of the worms (220) attached via a socket or joint (230) to the platform (214) to raise or lower a corner (232) or side of the platform (214) and control an orientation (206) of the platform (214), and
the elements (900) each comprise a reflective surface (202) comprising a surface of a coating or film (216) on the platform (214).

B18. The apparatus of any of the clauses B15-B17 implemented in the system of any of the clauses B1-B14.

B19. A method for harvesting energy, comprising:
coordinating a set of transmitter drones (802) to:
receive solar energy (804) on an element, and
transmit at least a portion (810) of the solar energy (804) to a device (812) on a receiver drone (814), the device (812) including at least one of a photovoltaic device (816) device (812) or a first thermoelectric module (818), and
so that the device (812) converts the at least a portion (810) of the solar energy (804) to electrical power with increased efficiency.

B20. The method of clause B19, wherein the element comprises at least one of a reflector (902), a transmissive element, or a second thermoelectric module (906).

B21. The method of any of the clauses B19-B20 implemented using the apparatus or system of any of the clauses B1-B18.

Camouflaging Embodiments

C1. A system (1000) for camouflaging, comprising:
a set (104) of drones (106) comprising one or more sources (1002) of radiation (1004); and
a computer (1200, 1202) coupled to the drones (106), the computer (1200, 1202) coordinating:
positioning of the set (104) of drones (106), and
a transmission of the radiation (1004) from each of the drones (106) in at least one of a direction:
above the drones (106), so that the radiation (1004) camouflages a region (1010, 1016) below the drones (106) from a detection (1012) from above the drones (106), or
below the drones (106), so that the radiation (1004) camouflages the region (1010, 1016) above the drones (106) from a detection (1012) from below the drones (106).

C2. The system (1000) of clause C1, wherein:
the sources (1002) of radiation (1004) comprise at least one of a first source (1022) emitting the radiation (1004) comprising visible light (1024) or a second source (1034) emitting the radiation (1004) comprising infrared radiation (1004) (1036),
the visible light (1024) has a color of a ground (1026) on which an object (1030) in the region (1010, 1016) is located so that the object (1030) is obscured from the detection (1012) by the radiation (1004), and
the infrared radiation (1004) (1036) has a different thermal signature than the region (1010, 1016), so that the region (1010, 1016) below the drones (106) appears to have a different temperature (1038) to the detection (1012) than the region (1010, 1016) actually has.

C3. The system (1000) of any of the clauses C1-C2, further comprising a camera (1032, 1136) connected to the drones (106) or a satellite (1017) in communication with the drones (106), wherein the camera (1032, 1136) or satellite (1017) provide an image of the region (1010, 1016) used by the computer (1200, 1202) to determine the color.

C4. The system (1000) of any of the clauses C1-C3, wherein the sources (1002) comprise one or more light emitting diodes arranged in a display.

C5. The system (1000) of any of the clauses C1-C4, wherein the computer (1200, 1202) arranges the drones (106) to form a screen or display comprising the sources (1002), so that the screen or the display displays an image or outputs the radiation (1004) having at least one of a wavelength or intensity distribution obscuring the region (1010, 1016) from the detection (1012).

C6. The system (1000) of any of the clauses C1-C5, wherein the computer (1200, 1202) coordinates the transmission of the radiation (1004) associated with motion of an object (1030) or changing temperature of an object (1030) in the region (1010, 1016).

C7. The system (1000) of any of the clauses C1-C6, wherein the sources (1002) output at least one of:
the radiation (1004) having a first thermal signature of a cold body, so that the region (1010, 1016) below the drones (106) would appear colder to the detection (1012) than the region (1010, 1016) actually is.
having a second thermal signature of a hot body, so that the region (1010, 1016) below the drones (106) would appear hotter to the detection (1012) than the region (1010, 1016) actually is.

C8. The system (1000) of any of the clauses C1-C7, wherein the sources (1002) comprise a thermoelectric device (1104).

C9. The system (1000) of clause C8, wherein:
the radiation (1004) comprises a visible light (1024) and an infrared radiation (1004) (1036),
the system (1000) comprises a plurality of paired source (1100)s including:
a first source (1022) emitting the visible light (1024)
a second source (1034) comprising the thermoelectric device (1104) emitting the infrared radiation (1004) (1036),
each of one or more of the paired source (1100)s are mounted on a mount (1106) to a different one of the drones (106), wherein the mount (1106) orients:
the first source (1022) to emit the visible light (1024) above the drones (106), the visible light (1024) having a color of a ground (1026) on which an object (1030) in the region (1010, 1016) is located so that the object (1030) is obscured from the detection (1012) by the visible light (1024), or
the second source (1034) to emit the infrared radiation (1004) (1036) above the drone, the infrared radiation (1004) (1036) having the first thermal signature of the cold body or the second thermal signature of the hot body.

C10. The system (1000) of clause C9 or C8, wherein the thermoelectric device (1104) has:
a cold surface (1114) emitting the infrared radiation (1004) (1036) having the first thermal signature of the cold body, and
a hot surface emitting the infrared radiation (1004) (1036) having the second thermal signature of a hot body.

C11. The system (1000) of clause 10, wherein the cold surface (1114) is thermally coupled to the first source (1022) so as to cool the first source (1022).

C12. The system (1000) of any of the clauses C9-C11, wherein the mount (1106) comprises:
a base (1118);
one or more panels, the first source (1022) attached to a first side (1110) of each of the panels and the thermoelectric device (1104) attached to a second side (1112) of each of the panels, the first side (1110) opposite the second side (1112),
a shaft (1116, 1122) connected to the panels and the base (1118) and positioning each of the paired source (1100)s above a cavity (1132) in the base (1118);
a motor coupled to the shaft (1116, 1122) via a gearing system (1000), the computer (1200, 1202) instructing the motor to rotate the shaft (1116, 1122) about a longitudinal axis (1130) to switch between a first mode wherein the first source (1022) emits the visible light (1024) above the drone and a second mode wherein the thermoelectric device (1104) emits the infrared radiation (1004) (1036) above the drone; and wherein:
the cavity (1132) is dimensioned and shaped to accommodate at least a portion of the panel (1108) during rotation of the panel (1108) between the first mode and the second mode to reduce aerodynamic drag of the panel (1108).

C13. The system (1000) of any of the clauses C1-C12, wherein the source of radiation (1004) outputs the radiation (1004) having an electromagnetic signature of a weather that is different from an actual weather of the region (1010, 1016).

C14. The system (1000) of clause C13, wherein the weather comprises at least one of a storm, a moving warm front, a cold front, a stationary front, an occluded front, rain, fog, or hail.

C15. The system (1000) of any of the clauses C1-C14, wherein the computer (1200, 1202) coordinates the positioning to arrange the drones (106) in one or more layers (1050) or an array comprising one or more rows (1052) of the drones (106).

C16. The system (1000) of clause C15, wherein the drones (106) comprise adjacent drones (106) in a row or a layer and a spacing (1054) between the adjacent drones (106) is less than a Rayleigh criterion for a wavelength of the radiation (1004), such that the detection (1012) cannot resolve the adjacent drones (106) and the rows (1052) or layers (1050) appear continuous.

C17. The system (1000) of any of the clauses C1-C16, wherein the radiation (1004) comprises infrared radiation (1004) (1036) having a thermal signature giving an appearance to the detection (1012) of an object (1030) in the region (1010, 1016) that is actually not there.

C18. An apparatus for camouflaging, comprising:
a set (104) of drones (106), each of the drones (106) having one or more sources (1002) oriented to output radiation (1004)
in at least one of a direction:
above the drones (106), so that the radiation (1004) camouflages a region (1010, 1016) below the drones (106) from a detection (1012) from above the drones (106), or
below the drones (106), so that the radiation (1004) camouflages a region (1010, 1016) above the drones (106) from a detection (1012) from below the drones (106).

C19. The apparatus of clause C18, wherein:
the sources (1002) comprise one or more paired source (1100)s each comprising at least one of a first source (1022) emitting the radiation (1004) comprising visible light (1024) and a second source (1034) emitting the radiation (1004) comprising infrared radiation (1004) (1036),
the visible light (1024) having a color of a ground (1026) on which an object (1030) in the region (1010, 1016) is located so that the object (1030) is obscured from the detection (1012) by the radiation (1004), and
the infrared radiation (1004) (1036) having a different thermal signature than the region (1010, 1016), so that the region (1010, 1016) below the drones (106) appears to have a different temperature (1038) to the detection (1012) than the region (1010, 1016) actually has.

C20. The apparatus of clause C18 or C19, wherein:
each of the drones (106) further comprise a mount (1106) comprising a mechanism controlling an orientation of the one or more sources (1002) mounted on the mount (1106), and
the mount (1106) comprises:
a base (1118);
one or more panels, the first source (1022) attached to a first side (1110) of each of the panels and the second source comprising a thermoelectric device (1104) attached to a second side (1112) of each of the panels, the first side (1110) opposite the second side (1112),
a shaft (1116, 1122) connected to the panels and the base (1118) and positioning each of the paired source (1100)s above a cavity (1132) in the base (1118);
a motor coupled to the shaft (1116, 1122) via a gearing system (1000) to rotate the shaft (1116, 1122) about a longitudinal axis (1130) to switch between a first mode wherein the first source (1022) emits the visible light (1024) above the drones (106) and a second mode wherein the second source (1034) emits the infrared radiation (1004) (1036) above the drones (106); and wherein:
the cavity (1132) is dimensioned and shaped to accommodate at least a portion of the panel (1108) during rotation of the panel (1108) between the first mode and the second mode to reduce aerodynamic drag of the panel (1108).

C21. The apparatus of any of the clauses C18-C20 implemented using the system of any of the clauses C1-C19.

C22. A method for camouflaging, comprising:
coordinating:
a positioning of a set (104) of drones (106), and
a transmission of radiation (1004) from each of the drones (106) in at least one of a direction: above the drones (106), so that the radiation (1004) camouflages a region (1010, 1016) below the drones (106) from a detection (1012) from above the drones (106), or
below the drones (106), so that the radiation (1004) camouflages a region (1010, 1016) above the drones (106) from a detection (1012) from below the drones (106).

C23. The method of claim 22, wherein:
the radiation (1004) comprises at least one of visible light (1024) or infrared radiation (1004) (1036),
the visible light (1024) has a color of a ground (1026) on which an object (1030) in the region (1010, 1016) is located so that the object (1030) is obscured from the detection (1012) by the radiation (1004), and
the infrared radiation (1004) (1036) has a different thermal signature than the region (1010, 1016), so that the region (1010, 1016) below the drones (106) appears to have a different temperature (1038) to the detection (1012) than the region (1010, 1016) actually has.

C24. The method of any of the clauses C22-C23 implemented using the apparatus or system of any of the clauses C1-C19.

C25. A synchronized UAV system for providing dynamic cover (camouflage or infrared blocking for satellite imagery for an object including a plurality of UAVs, each UAV comprising at least one rotatable panel having a first side with an light display and a second surface with a thermoelectric cooling module; and a control unit configured to (i) coordinate movement of the plurality of UAVs to position the UAVs relative to one another to substantially cover an object and (ii) coordinate orientation of the at least one rotatable panel of the UAVs to (a) orient at least some of the light displays so as to provide dynamic camouflage over the object and/or (b) orient at least some of the thermoelectric cooling modules to provide an infrared blocking cover over the object. In an example, the orientation of the panels can be coordinated to provide simultaneous dynamic camouflage over the object and infrared blocking cover over the object.

C26. The system of clause C25 wherein each UAV comprises a camera disposed on an underside of the UAV to detect colors that are appropriate for the dynamic camouflage or the infrared blocking cover.

C27. The system of clause C25, wherein orienting at least some of the light displays so as to provide dynamic camouflage over the object comprises orienting each of the light displays to emit light in an upward direction toward the sky.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A system for increasing a signal to noise ratio of a communication comprising a signal, comprising:
a set of drones;
a plurality of elements, each of the elements mounted to a different one of the drones; and
a computer, communicatively coupled to the drones, the computer coordinating the set of drones to:
receive, on the elements, electromagnetic radiation carrying the signal transmitted from a transmitter, and
transmit, from the elements, the electromagnetic radiation to a receiver, the receiver disposed on at least one drone of the set of drones, and
wherein the receiver receives the signal having a signal to noise ratio greater than the signal received without transmission from the elements.

2. The system of claim 1, wherein each of the elements comprise a reflector, a scattering element, a diffractive element, or a non-diffractive transmissive element.

3. The system of claim 2, wherein the elements each comprise the reflector having a length and a width at least three times larger than a wavelength of the electromagnetic radiation so as to reduce scattering of the electromagnetic radiation by the reflector.

4. The system of claim 2, wherein the elements each comprise the scattering element and the computer coordinates the drones so that the elements form a phased array scattering the electromagnetic radiation to form scattered waves that constructively interfere at the receiver.

5. The system of claim 4, wherein the scattering element comprises an antenna.

6. The system of claim 2, wherein the scattering element:
has a shape filtering the electromagnetic radiation to form filtered electromagnetic radiation, and
transmits the electromagnetic radiation comprising filtered electromagnetic radiation to the receiver.

7. The system of claim 6, wherein:
the electromagnetic radiation comprises a polarization having a first component having a first direction and a second component having a second direction, and
the scattering element has an axis parallel to the first direction and:
scatters the first component to the receiver,
does not scatter the second component to the receiver.

8. The system of claim 1, wherein the elements each comprise a diffraction grating diffracting the electromagnetic radiation to form one or more diffracted beams transmitted to the receiver.

9. The system of claim 1, wherein the elements each comprise a transmissive element having a different shape and the computer coordinates the drones so that the elements are assembled to form a lens refracting the electromagnetic radiation onto the receiver.

10. The system of claim 1, wherein:
the computer comprises a navigation system acquiring positioning of a satellite relative to the drones,
the satellite comprises the transmitter and the set of drones comprise a receiver drone comprising the receiver, or
the satellite comprises the receiver and the set of drones comprise a transmitter drone comprising the transmitter.

11. The system of claim 1, wherein computer coordinates the drones to form an array of the drones at positions having coordinates lying on convex surface in a coordinate system, so that the electromagnetic radiation transmitted from the drones is focused on, concentrated on, converged on, or directed to, the receiver.

12. The system of claim 11, wherein the convex surface comprises a paraboloid, an ellipsoid, or a spheroid.

13. The system of claim 1, wherein the elements further comprise a plurality of reflective surfaces, each of the reflective surfaces mounted on a mount to a different one of the drones, wherein:
the computer controls an orientation of each of the reflective surfaces relative to the each of the drones via an actuator and the mount, and
each of the reflective surfaces reflect a portion of the electromagnetic radiation to the receiver.

14. The system of claim 13, wherein the computer adjusts an orientation of one or more of the reflective surfaces to correct for a distortion of a wavefront of the electromagnetic radiation incident on the reflective surfaces.

15. The system of claim 13, further comprising the computer coordinating the drones to form an array of the drones at positions wherein the reflective surfaces form or approximate a convex surface focusing, concentrating, directing, or converging the electromagnetic radiation on the receiver.

16. The system of claim 13, wherein the mount comprises a mechanism adjusting the orientation in two orthogonal directions x and y of a cartesian coordinate system.

17. The system of claim 13, wherein the mount comprises a platform and each of the reflective surfaces comprise a surface of a film on the platform.

18. The system of claim 17, wherein:
the mount is connected to a worm drive comprising a plurality of worms,
each of the worms are attached via a joint to the platform to raise or lower a corner or side of the platform to control the orientation.

19. The system of claim 1, further comprising the computer coordinating the drones into an array of the drones forming a dish shape directing the electromagnetic radiation to the receiver.

20. The system of claim 1, further comprising a container for storing the set of drones.

* * * * *